US005478990A

United States Patent [19]
Montanari et al.

[11] Patent Number: 5,478,990
[45] Date of Patent: Dec. 26, 1995

[54] METHOD FOR TRACKING THE PRODUCTION HISTORY OF FOOD PRODUCTS

[75] Inventors: Danny J. Montanari, Arvada; Glenn M. Coleman, Saguache, both of Colo.

[73] Assignee: Coleman Environmental Systems, Inc., Denver, Colo.

[21] Appl. No.: 137,290

[22] Filed: Oct. 14, 1993

[51] Int. Cl.⁶ .................................................. G06F 15/20
[52] U.S. Cl. .................................................. 235/375
[58] Field of Search .................................. 235/375, 380

[56] References Cited

U.S. PATENT DOCUMENTS

| | | | |
|---|---|---|---|
| 1,195,946 | 8/1916 | Armstrong . | |
| 1,257,065 | 2/1918 | Bagby . | |
| 3,755,934 | 9/1973 | Porcher et al. | 40/2 F |
| 4,034,668 | 7/1977 | Picknick et al. | 101/35 |
| 4,256,569 | 3/1981 | Wallace | 209/3.3 |
| 4,262,632 | 4/1981 | Hanton et al. | 119/1 |
| 4,275,480 | 6/1981 | Norton et al. | 17/25 |
| 4,286,599 | 9/1981 | Hahn et al. | 128/316 |
| 4,510,495 | 4/1985 | Sigrimis et al. | 340/825.54 |
| 4,581,271 | 4/1986 | Gordon | 428/67 |
| 4,597,495 | 7/1986 | Knosby | 209/3.3 |
| 4,854,328 | 8/1989 | Pollack | 128/736 |
| 4,909,250 | 3/1990 | Smith | 606/117 |
| 5,104,352 | 4/1992 | Dransfield | 452/198 |
| 5,105,763 | 4/1992 | Poiesz et al. | 119/51.02 |
| 5,194,036 | 3/1993 | Chevalier et al. | 452/198 |

FOREIGN PATENT DOCUMENTS

| | | |
|---|---|---|
| 2339221 | 9/1977 | France . |
| 2590764 | 6/1987 | France . |
| 2142557 | 10/1986 | United Kingdom . |

Primary Examiner—Donald Hajec
Assistant Examiner—Jeffrey R. Filipek
Attorney, Agent, or Firm—Sheridan Ross & McIntosh

[57] ABSTRACT

A method for tracking food products and/or food supplements, preferably organic products and meat products, is provided to enable verification of product origination and to trace back the source of pathogens. In one embodiment, individual animals are tagged with a unique code and such code is maintained throughout the animal's growth, slaughter and processing. Additional information may be added to computer databases with respect to the animal's genetic makeup, weight, feeding regimen, microbiological profile, fat-to-lean meat ratio, etc., and such information can be correlated with the animal's unique identification number. In the fabrication of an animal, a predetermined number of tags is generated for display on each portion of an animal carcass severed during the fabrication process. The present invention permits ultimate consumer's of food products, and particularly meat products, to identify the source and origin of a food product in order to trace back sources of contamination and/or to verify the organic or natural status of a food product.

34 Claims, 18 Drawing Sheets

Animal Tracking Number [A-TN]

Owner Code  Chrono Code

Label Sequence Code

Retail Tracking Number [R-TN]

1 DATE &TIME
2 PRODUCTDESCRIPTION
3 CLASSIFICATIUON OR LOT IDENTIFICATION
4 PRODUCT CODE
5 BAR CODE
6 HUMAN READABLE

7 NET WEIGHT

METHOD FOR TRACKING THE PRODUCTION HISTORY OF FOOD PRODUCTS

FIELD OF THE INVENTION

The present invention is directed to a method of tracking food products, preferably organic products and meat products, throughout a growing or production process operation to enable verification of product origination and to provide a record of what production methods, additives and treatments were used to produce the food product.

BACKGROUND OF THE INVENTION

In the food industry, and particularly in the meat industry, devoted to the production and processing of beef, veal, lamb, pork, poultry, fish and seafood, there is a lack of any satisfactory method for tracking the production history of an individual product. Without such a method, it is difficult, if not impossible, to identify the source of problems that arise at the consumer level. There exists a long-felt but unsolved need to establish a system capable of identifying and verifying the source and origin of a food product that transcends all steps involved in the meat production process.

The consequences stemming from the absence of a satisfactory tracking method have been severe. A recent *E. coli* outbreak in the Pacific Northwest resulted in the deaths of several youths. USDA investigators were unable to trace the outbreak back to any point of origin. Instead, investigators had to be content with identifying nine meat processing plants that supplied hamburger meat to a national fast food chain. The actual source of contamination and the individual animal carcasses involved will forever remain a mystery. In response to the deficiencies of the present system, government officials and consumers alike are demanding that a solution to the problem be found.

The lack of a satisfactory food product tracking system also has significant economic ramifications. For example, the export market for beef to Europe has been curtailed due to the animal raising practices used in the U.S. The Europeans have established guidelines for meat production that preclude the use of hormones or other growth stimulants in the animal growing process. Significant markets for U.S. products have remained essentially closed due to the present inability to certify that animal raising practices used in the U.S. comply with stringent European requirements.

With the rise of free markets and the awareness of a global economy, a system is required that can identify food products that cross international boundaries. Health and safety regulations with respect to food products differ in various countries and a system is required that can verify the source and origin of products to ensure compliance with such varied regulations. Attitudinal barriers also exist in various countries that prevent the establishment of a true free market. For example, some Japanese have shown a preference for Australian beef as opposed to U.S. beef based upon a belief that the hygienic practices used in Australia are better than those used in the U.S. A system is required that enables the tracing back of process steps so that such concerns are addressed.

The formation of a suitable means of inventory control and identification system for food products presents several challenges. By way of example, the production cycle for some meat products takes several years. In the case of cattle, the cycle from birth to consumption may take in excess of ten years. Second, ownership of an animal may change several times before any meat product is sold to a consumer. An animal may be born and raised by one segment of the industry, grown to production weight by another, slaughtered by still another, processed by another, and finally distributed through an extensive and complex system to reach the ultimate consumer. At present, there is no suitable system in place to readily identify the chain of custody of a meat product throughout its production history.

The present methods employed in the purchasing of meat animals also presents difficulties. For example, raisers and growers of animals are paid for their production based upon live animal weight. In contrast, slaughterers, fabricators, distributors, retailers, and consumers purchase meat based upon type, quality and weight. Raisers and growers of animals are therefore not compensated based upon the lean meat content produced by the animals they raise. In the absence of any direct incentive to provide leaner animals, raisers and growers are content to accept a pricing structure that values lean animals as much as fat-ladened animals. Consumer demand for leaner meat products has had little effect on the industry practice of raising animals containing significant amounts of fat. No satisfactory method presently exists to determine the actual lean meat production of an individual animal and to compensate ranchers and growers on that basis. This deficiency in the present system rewards raisers and growers for producing products that consumers are not demanding and precludes the establishment of a compensation system that encourages better animal raising practices.

Due to the complexity of the meat production process, it is difficult for a raiser to determine the efficiency of their animal raising practices. Although information is available with respect to the genetic traits of meat animals in general, a raiser has no means of determining the actual meat production efficiency of his particular breeding program. Because animals are typically purchased on the open market, any information relating to improvements in meat production efficiency is lost due to the non-individualized production procedures currently practiced. Since no unifying means of identification presently exists, production efficiencies in various segments cannot be measured and valuable information regarding animal raising practices is therefore unavailable.

With respect to food products in general, problems have arisen relating to the tracking of chemical agents used to extend the shelf life of food products. For example, Alar use on apples, sulfite use in the wine industry, use of irradiation as a preservation method, and MSG use in a variety of food products, have created significant consumer concerns. A method is required to assure consumers that the food products they purchase and consume are free from undesired agents (or that contain an amount or level of particular agents, whether or not such agents are inherently considered undesirable) and that such foods can be verified as being produced in accordance with certain procedures.

In response to consumer demands, some producers have opted to pursue "niche" markets. These markets include, but are not limited to, natural, organic, nutritional content, health benefit, or low fat labeled products. The USDA has recognized the difficulty in certifying these claims for labeling purposes. Many of these claims could be justified if a system existed which could verify a producer's claims. With the advent of USDA guidelines for organic labels, a system is required to certify that a product has been organically produced. Such requirements, however, do not readily lend themselves to any type of verification and thus do not prevent unscrupulous producers, for example, from falsely marketing products as "organic." The USDA has recognized the difficulties involved in certifying certain claims for labeling purposes, but to date there is no satisfactory system that allows for the production process of food products to be verified.

To address the concerns as expressed above, a need exists for a consistent method of identification and trace back of food products, and particularly meat products, to ensure that the source and quality of such products can be verified.

SUMMARY OF THE INVENTION

The present invention is directed to a method for tracking the production history of food products, and particularly meat products, to enable verification of the origin of such products and to trace back the source of problems that may arise at the consumer level of product distribution. Use of the present method provides needed information to a broad spectrum of individuals and groups to remedy a plethora of present problems. For example, the present invention provides food producers with feedback about their production practices, consumers are provided with a method to ensure the veracity of food safety and product claims, the Food Safety Inspection Service is provided with a method to monitor and trace pathogens in animals, and State Livestock Brand Inspection Agencies are able to track the sale and transfer of animals based upon an individual animal's identity. Hazard Analysis and Critical Control Points (HACCP) can also be tracked to assist operators in improving their HACCP programs. The present invention allows third party verifiers to control and administer their specific product identification certifications. Environmental organizations are provided with a system for monitoring and tracking grazing practices of wild and domestic animals. Moreover, international organizations are provided with a process to identify the source and quality of food products transferred across international boundaries.

The present invention involves the generation of a Tracking Number (TN) identifying a particular food product at a certain point in the production process. By way of illustration, a meat producing animal is preferably identified with a TN at birth. The Tracking Number is maintained as the animal is transferred from raiser, to feedlot, to slaughterhouse, fabrication plant, distributor, and finally to the ultimate consumer. After an animal is slaughtered, labels (or tags) displaying the Tracking Number are generated for each quarter of the animal. Subsequent labels are generated to identify specific portions of meat produced during the fabrication of the animal, and further labels are generated that accompany the portion of meat ultimately sold to a retail customer. The labels produced during the process are periodically scanned in different stages of the process to add additional information thereto, such as the weight of meat portions, meat shrinkage, grade, microbacterial condition, etc.

In one embodiment, a tagging system is provided to trace a processed meat product back to the animals from which such product was made. A production lot number is created to designate the identity of the animals making up the processed meat product sold to a customer, such lot number capable of being used to later identify the source and origin of the animals used to produce the retail product.

Other aspects of the present invention include a way to calculate the compensation to be paid to animal producers based upon the lean meat content of individual animals. Yet another aspect of the present method relates to the tracking of pathogens and residues to the point of origin. Moreover, the present invention is directed to a method for tracking the type of substances that a food product has been exposed to during its development, including, for example, the substances ingested by an animal, the medicines administered to such animal and the environmental conditions under which the animal was raised. Finally, the present invention provides a method for verifying product claims made by producers of conventionally, organically or naturally produced foods. A tracking number can also be used in tracking origin and production information for non-food products, such as cotton, tobacco, mineral supplements, etc.

In one embodiment of the present invention, a method is disclosed for tracking the production history of a food product by affixing a label to a food product, such label having identifying numbers or letters thereon, recording additional information during the processing of the food product and correlating such information with the identifying numbers or letters on the affixed label. As used herein, the term "processing" generally refers to the progress of a product from its origin to its final form, and more particularly refers to the growing, harvesting, smoking, cooking, grinding, cutting, seasoning, freezing, and/or curing of a product. A means, such as a computer database, is provided for accessing the information by referring to the label. Such method is useful in the processing of a variety of foods products, including animal byproducts, vegetables, fruits, grains, vitamins and mineral supplements. The present invention is particularly useful when the food comprises a meat animal and is also particularly useful in verifying that a particular food product was produced pursuant to a specified process, for example, an organic or natural process. The labels used can contain information in human readable form, but are preferably capable of being read by an electronic device and of having the information encoded thereon accessed by a computer. As such, labels are preferably bar-coded tags, magnetically coded tags or implanted identification devices and are preferably made of metal, plastic, glass, fiberglass or composite materials that can be readily sanitized. Labels can take the form of ear tags, tattoos, leg bands or fin clips. In one embodiment, at least one of the additional labels produced during the processing of the food product has an adhesive backing permitting the attachment of the label to a retail product package. The types of information referenced or included on such labels can comprise the weight of the product after specific processing steps, microbacterial profiles of the product, date and time of processing of the product, the original and subsequent producers of the product, as well as other pertinent information relating to the product's identifying characteristics such as the organic and/or natural status of the product, nutritional information, genetic information, lean-to-fat ratio, medical history, agent exposure information including chemical, additive, residue, hormone and radioactive agents.

In one embodiment of the invention, a method is provided for determining the animal of origin from which an animal byproduct is derived. As used herein, an "animal byproduct" comprises any product that can be derived from an animal, including, but not limited to, the meat, bones, milk, hide, and edible and inedible offal, such as blood, tissue, organs (e.g., brain, heart, liver, tongue, lungs, etc.), feathers, semen, ovum and excrement of an animal. Animals from which byproducts may be derived include those selected from the group of poultry, bovine, porcine, equine, sheep, fish, shellfish and wild game. Pursuant to such method, an animal is coded with a first identification tag, slaughtered, its hide is removed and the first tag is maintained with the animal carcass. The animal is then subsequently fabricated into various portions, each of such portions identified with an additional coded tag having at least the information contained on the first coded tag. Preferably, animals are slaughtered after all chemical, additive, residue, hormone and radioactive agents withdrawal periods have been observed. Moreover, while labeling of animals can be performed at any time during the animal's life and processing, animals are preferably labeled within about three months from birth, and more preferably at birth.

In yet another embodiment of the present invention, a method is provided for determining the identity and origin of food products, and particularly, animals used to produce processed food products, for instance, ground meat products. In one such embodiment, the date and time at which an animal carcass is received at a fabrication plant is recorded. The time necessary to fabricate the animal is determined, particularly the time at which a combination of various meat portions from individual animals is made during the fabrication process. Meat portions from various individual animals are then combined and the combination of such meat portions is identified, preferably by a lot symbol, which can be a number, letter, word, color or other identifying representation. The time at which the combination of various meat portions is performed is recorded. Finally, by correlating the time of receipt of an animal carcass with the time at which a combination of individual meat portions is made, together with the time necessary for processing the animal, (at least to the point of combination of various meat portions from individual animals) the individual animals from which a particular processed meat product is derived can be determined.

In a still further embodiment of the present invention, a method is provided for determining the lean meat production of an animal. An animal identification tag is affixed to a particular animal, the animal is weighed prior to fabrication and subsequent to fabrication, and the weight of lean meat portions derived from an individual animal is determined. Using such information, the lean meat production of an individual animal can be determined by correlating the weight of the animal prior to fabrication with the weight of the meat portions derived from said animal after fabrication.

Using the present method, breeding strategies can be improved by facilitating the selection of genetic traits, feeding regimens and production methods that enhance the lean meat production of an animal. The method can also be utilized to compensate ranchers based upon the lean meat value of an animal rather than upon the conventional means of economic compensation used in the industry.

Yet a further embodiment of the present invention relates to the tracking of pathogens or residues in an animal byproduct. This method entails the affixing of a first identification tag to an animal prior to the fabrication of the animal. The animal is fabricated in a manner so that meat derived from the animal is identified with an additional identification tag containing at least the information present on the first identification tag. The meat derived from an animal is tested for the presence of pathogens or residues at any point during the production process, preferably just prior to the packaging of the meat product. In such a manner, individual animals from which pathogen-containing meat is derived can be determined by referencing the additional identification tag.

Among the unique features of the present invention is the production of identification labels throughout a production process rather than having a specific number of tags generated at the beginning of an identification process. The tags and labels used in the present process are preferably designed so as to permit effective sanitation and/or sterilization of such tags and labels, thereby maintaining sanitary conditions during the processing of food products. Conventional tagging systems often utilize tags made of materials that do not facilitate the maintenance of hygienic conditions due, for example, to the paper booklet-type nature of duplicate identification tags. Such tags tend to be prone to damage and/or contamination with undesirable microorganisms and material, making them unsuitable for use in a sanitary food production operation.

Unlike conventional systems, the present invention utilizes computers to scan labels produced during a production process to input information into a computer database for later retrieval and access. In particular embodiments of the present invention, labels are provided that can be peeled from tags attached directly to food products so that such labels can be easily peeled and attached to packages containing such food products. The present method is flexible in that additional identification tags can be created dependent upon the type of product being processed and the type and quantity of information being recorded. The products subject to identification using the present method include food products, vitamins, mineral supplements, animal meat and byproducts (such as offal, bones, hide, etc.), as well as non-food products such as tobacco, cotton, etc. The present method provides a system for verifying that a particular production process was carried out (i.e., whether a product was conventionally, organically or naturally produced). The product information numbers used in the present method to identify particular products during a production process not only permit the tracking of particular information, such as weight, ownership, production history, etc., but also provide a means for distinguishing individual portions of a product that has been disassembled and/or fabricated. The present process can be utilized to identify both fresh as well as frozen food products and can further be used to record information relating to the storage, shelf life and microbiological profiles of such products.

DETAILED DESCRIPTION

Figure 1:
FIG. 1 is a drawing denoting the various types of Tracking Number (TN) labels used for identifying animals and animal portions during a production process.
Figure 1:
Figure 1:
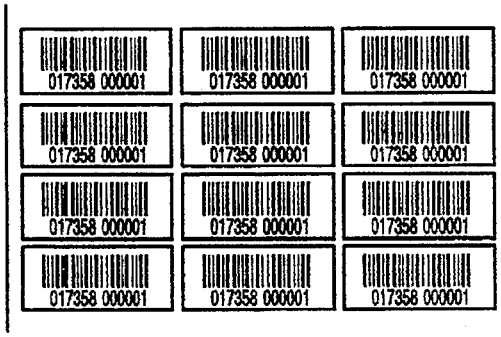

The present invention involves a method of food product identification, and particularly animal identification, whereby it becomes possible to track a retail food product back to its original source, providing a means of product trace back and product identification throughout the course of a distributive process. The present method makes it possible to reward production efficiency, verify product claims and discover the source and level of pathogens or residues. As used herein, the term "residue" refers to any undesired agent, including, but not limited to, natural and synthetic chemicals, bacteria, minerals and particulate matter. As used herein, the term "pathogen" refers to any agent that causes or promotes diseases or illnesses in animals, and particularly in humans, such pathogens including those of parasitic, viral or bacterial origin. Pathogens include, but are not limited to, pathogenic bacteria such as *E. Coli*, Salmonella, *F. Coliforms*, Listeria, Staphylococcus, *F. Streptococcus, Bacillus Anthraces, Balantidium Coli, Campylobacter Coli, Campylobacter JeJune, Francisella Tularensis*, Sarcocystis, *Taenia Saginata, Taenia Solium, Toxoplasma Gondil, Trichinella Spiralis, Yersinia Enterocolinea, Yersinia Pseudotuberculosis*, Brucella, *Chlamydia Petechia*, Leptospira and Clostridium.

The present invention provides for verification of product claims by tracking the growing process of food products, and particularly those derived from animals, to ensure that particular drugs, feeds, or medicines, pesticides, either were or were not utilized during the raising of the food product. The present method also provides a means of pathogen tracking by maintaining a microbiological profile for a food product, particularly animals and meat products derived therefrom. As used herein a "microbiological profile" refers to the identification of microorganisms present on a product. The present method can further be used to identify and monitor genetic traits of an animal or food product, and thereby track production efficiencies to provide information for use in altering breeding, selection, growing and/or feeding programs so that food product efficiencies can be improved. By using the present invention, food safety is improved due to the ability to recall tainted or contaminated food and meat products based upon the identification of the growers and/or animals from which such products were derived. The present method therefore provides a way to track down responsible parties in the event a product is deemed to pose a health hazard to the public at large. The present method also provides a way to keep track of vital statistics of meat animals which can then be used to discern the actual lean meat production of an animal.

As is true of the food industry in general, the meat production process involves the participation of separate industry segments, including raisers, growers, slaughterers, fabricators and distributors. As used herein, raisers are the initial producers of meat products (e.g., ranchers, poultry raisers, fishermen). Growers refer to producers who acquire animals from raisers and increase the weight of the animals through a feeding process. The slaughterer's function is to kill animals for processing. Fabricators purchase animal carcasses or parts thereof and process them by cutting, chopping, sawing, slicing, mixing, or grinding into desired portions and packaging such meat products. Distributors include the resellers, wholesalers and retailers who are responsible for the distribution and sale of meat items to ultimate consumers.

Using the present method, the identity of a food item subjected to each segment of the production process is maintained and information garnered throughout the process is kept track of, preferably by using electronic means such as a computer database. Electronic identification means is intended to refer to, but is not limited to, bar-codes, electronic implants, magnetic stripes and other means of identification used to increase both the speed and reliability of reading and capturing information. As used herein, "database" refers to the software, hardware and other processes used to collect and report data through use of a computer system.

In reference to food products, the term "natural" refers to those products that are minimally processed and possess essentially no artificial ingredients. For example, meat products are considered natural where the meat animal is raised from birth without significant amounts of growth promoting hormones or antibiotics being administered to the animal. "Organic" refers to food products defined by the Organic Food Production Act of 1990 or the current use and definition as ascribed by law. In general, "organic" products are those that are grown without the use of any added synthetic chemicals, including animals that are not raised on feed that was grown using chemical pesticides, fertilizers, etc.

By way of illustration and without intending to be limited thereby, the following discussion is primarily directed to one embodiment of the present invention relating to the processing of meat animals. The present method, however, finds applications in other product industries, particularly the food industry, where the tracking of articles is deemed important. Specifically, while the discussion below pertains principally to meat processing, the overall method is easily adapted to track the origin and subsequent production history of food products in general. For example, one embodiment of the use of the invention is to identify products as being "organically" or "naturally" grown. Produce, for instance, can be verified as being "organically" grown by assigning a unique identification number to a lot of organically grown produce. When harvested, such produce are grouped into lots, the lots are assigned identification symbols and information relating to the organic raising of such produce is entered into a database and correlated to the lot numbers. As the produce is transported and further processed, additional information may be added to the database. At all times the identity of the produce is traceable by reference to the original lot number, which is maintained throughout the process. It will so be appreciated by those of ordinary skill in the art that non-food products, such as cotton, tobacco, wood, etc., can similarly be harvested in a like manner and lot symbols can be kept track of to verify the source and particular processing steps involved in the bringing of such products to the wholesale and/or retail consumer. In processes in which production times are fairly consistent, it is also within the scope of the present invention to keep track of when a product enters the production operation and how long the particular operation takes, and thereby derive the identity of individual products that went into the making of a particular lot of combined products.

In one embodiment, the present invention provides a method of animal identification and inventory control that allows each animal's identity to be maintained throughout the meat production process. The process of identification is maintained through the use of a series a identification tags or labels containing identifying numbers or letters, such information encoded as a bar-code, magnetic stripe, or incorporated into an implantable device. The information encoded is preferably capable of being read by an electronic device and may also be presented on a tag or label in human readable, alpha-numeric form.

In one illustrative embodiment of the present invention, as shown in FIG. 1, a tag is encoded with a Tracking Number, herein referred to as a TN. A desired number of additional tags may be generated that reference the information encoded on the original TN tag. In a particular embodiment of the present method, the following tags are generated: 1) an Animal Tracking Number (A-TN) which is the tracking number applied to a live animal; 2) an Offal Tracking Number (O-TN) which is attached to offal products; 3) a Production Tracking Number (P-TN) that is attached to a quarter of meat and that identifies fabricated primals and sub-primals derived from the animal of origin; and 4) a Retail Tracking Number (R-TN) that is presented on a primal or sub-primal cut for retail identification.

Figure 2:
FIG. 2 is an example of one type of Production Information Number (PIN) tag used for identifying products.

As shown in FIG. 2, a second type of numbering system may also be used in the identification process. A Production Information Number (PIN) can be generated to differentiate products fabricated from a single animal (as opposed to a TN which is used to identify individual animals). A PIN tag identifies each product with a unique serial number and may further include information relating to the measurement of a product, (which may include the weight, size, etc.) date and time of processing, description, grade, etc., as well as other desired information related to each product. In one embodiment, three (3) different PIN tags may be generated during the fabrication process of an animal: 1) a Quarter Product Information Number (Q-PIN) to identify each quarter produced from a carcass; 2) a Boxed Production Information Number (B-PIN) to identify a box of meat products; and 3) a Lot Production Information Number (L-PIN) to identify meat items created in a batch production process. A Lot Production Information Number (L-PIN) is generated to identify products that by their nature involve the combination of products from several animals, such as ground meat, processed meat, fat, bones, and trim. An L-PIN is utilized in situations where it is impossible or too difficult to separately identify a meat item by the individual animals comprising the product, (e.g., ground meat) or if the value of the item is such that it does not warrant individual tracking (e.g., fat, bones, etc.).

Unlike the typical manufacturing processes where products are assembled from various components, the meat industry disassembles a carcass into smaller meat portions for sale. For example, a carcass is cut into quarters, quarters into primals, and primals are cut into portion cuts. Using the present method, the TN is a constant reference of original identification through each segment of the production process. The TN permits any producer in any segment to have access to valuable data that would not otherwise be available.

As ownership and possession of an animal is transferred, the Animal Tracking Number (A-TN) is recorded on a tag, preferably in an electronic or computer readable form, such as a bar-code or magnetic strip, and vital information, such as prior owners, genetic history, weight, feeding history, microbacterial profiles, diseases, medications, etc., may be added to the database record via such tag at various times in the growth of the animal, as well as in the fabrication process.

The ability of the present system to trace back the origin of an animal is necessarily limited to the point of origin of the TN. While preferably assigned to an animal at birth, a TN may be assigned at any time in the meat production process. For example, if cattle are purchased by a feedlot owner, the animals can be marked with an A-TN and the feedlot then becomes the point of origin for identification and recording purposes. In the event an A-TN is lost prior to the feedlot, a new A-TN can be generated and the information concerning a particular animal can be determined from that point forward.

The present method is preferably initiated upon the origination of the food product, for instance, at the time of an animal's birth. It is also possible, however, to affix identification devices or labels to an animal at a specified time prior to the initiation of a particular process. For example, dairy cows are often slaughtered for their meat. The fabrication process should preferably begin only after all hormones or other medications have been sufficiently assimilated by the animal. Indeed, proposed government regulations proscribe that initiation of fabrication must not occur until after a specified withdrawal time period has been observed, typically about 60 days prior to slaughter.

In performance of the present method with farm animals, a rancher first affixes A-TNs to all of his breeding cows. A rancher may use a bar-coded tag, a magnetically encoded tag, or an implanted identification device that contains the individual animal's A-TN. Other identification methods and devices may also be utilized, including biodegradable devices, tattooed codes, etc. Further information, such as whether a cow has been artificially inseminated, the identity of the bull used to inseminate the cow, etc., may also be recorded and entered into a computer database for later retrieval and use.

After each animal is born, and preferably prior to weaning, an A-TN is affixed to each young animal, preferably encoding the identification of the raiser and a chronological number uniquely identifying the animal. The A-TN of the young animal and the A-TN of the mother of the animal is preferably scanned and entered into the computer database and correlated to generate a genealogical record. The rancher can also record whether the animal has had or has been exposed to any diseases, or whether the animal has had vaccinations and other medical treatments, and such information is matched to the animal's A-TN in the database, thereby creating a relatively comprehensive and microbiological record for each animal.

By attaching an A-TN to each animal and scanning that number into the database record, a rancher creates an inventory record of each animal that he owns. This record aids the rancher in managing his operation. For example, at weaning, an animal's weight is recorded in a computer database. Later, when the animal is sold to a feedlot, it is again weighed and a comparison of this weight information is used to determine the growing performance of the animal. This information can guide a rancher in selecting effective feeding strategies, preferred genetic traits, etc.

The feed and feeding locations of animals may also be recorded and entered into a computer database, thus creating a comprehensive historical record of what an animal was fed and when such feeding took place. By keeping a record of all location transfers of animals having specific A-TNs, it makes it possible to later determine whether and when an animal ingested material treated with undesired chemicals, such as pesticides or herbicides, or whether various other environmental conditions may have had any deleterious effects on the meat derived from such animals. As cattle are moved from pasture to pasture, the inventory record can track such locations, length of stay, and the number of animals on each pasture. If the rancher is using public land for grazing, a record of the number of animals on each allotment may be tracked by the Forest Service. This information allows grazing practices and performances to be monitored and properly administered.

The present invention affords a means of verification to ensure that animals raised in a particular manner are entitled to a specific designation, e.g., whether an animal is entitled to a "natural" or "organic" classification. To accomplish this, information verifying the "organic" certification of a particular pasture is recorded and combined with the A-TN of animals raised in such pastures. If there should later arise any question as to the organic classification of meat from a certain animal, for instance, such classifications can be verified by reference to the computerized record by using the animal's A-TN.

Upon the transfer of an animal from a rancher to a feedlot, the rancher records the sale in his database, often indicating whether the State Brand Inspection Agency authorized the sale. A record of each animal's A-TN is recorded by the brand inspector and the A-TN is transferred to the feedlot owner, providing the brand inspector with an accurate record of animal ownership. In cases where no brand inspection is available, the database record is capable of generating Bills of Sale or Bills of Lading to track the transfer of animals.

One possibility of maintaining the database record is to transfer all data to an agent of record. If such an agent is not available, data may be transferred on an electronic medium such as diskette. Another possible means of transfer would include transfer of information over phone lines via modems. A printout of the information could also be transferred between parties as ownership changes. This information can be filed for future reference or entered into the new owners database record.

In one embodiment of the invention, a feedlot operator receives an animal, weighs it, and scans the animal's A-TN coded ear tag to record such information into the feedlot operation's computer database. If the animal is organically raised, information can be recorded concerning what feeds the animal has been fed, what medications it has received, if the animal has been exposed to pesticides, etc. Using the present invention, a feedlot manager is able to access valuable data as to the performance, feeding, inventory, genetics, ownership and medical records of all cattle under his control.

Conformation information of the animal can also be matched to its A-TN to aid in the sorting of animals for more effective feeding. A feeding record is maintained to measure the feeding efficiency of each animal, permitting one to identify and relate efficiencies based upon genetic traits, feed rations, or the conformation of an animal. Such information allows feedlot owners to access information relating to the effective meat production of the animal and to thereafter select animals that are more cost effective to feed and that produce higher meat yields and/or to modify feeding regimens to improve meat production efficiencies.

Figure 3:
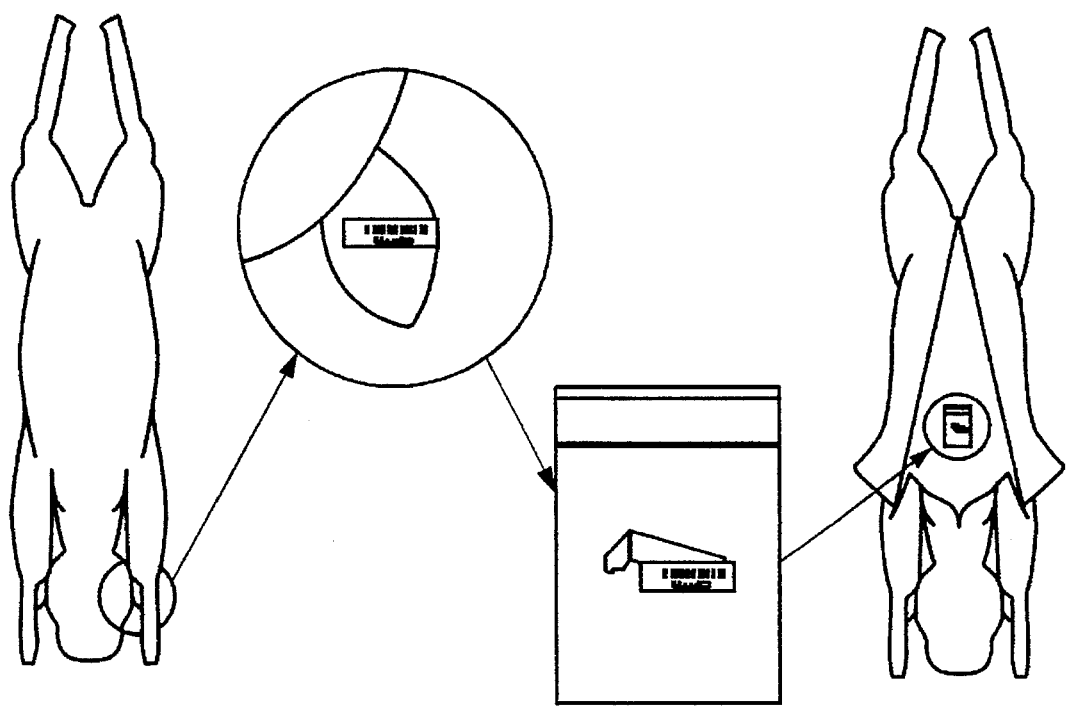
FIG. 3 is a schematic drawing showing an Animal Tracking Number (A-TN) in the form of a bar-coded ear tag for an animal and the transfer of the tag in a plastic bag for affixation to an animal carcass.

Once an animal has reached its desired weight, it is transferred to a slaughter plant with its original coded ear tag or other type of label intact. The feedlot operator records the transfer of each animal in his database and the State Brand Inspection Agency, a Bill of Sale, or Bill of Lading verifies the transfer. As shown in FIG. 3, the animals are unloaded, slaughtered, bled, and hung on a rail system and an incision is made to expose the brisket of the animal. Prior to the animal's hide being removed, an operator removes the ear tag from the animal. This ear tag is placed in a plastic bag, which is sealed for sanitary purposes, and the bag is then bolted or otherwise affixed to the exposed brisket of the animal.

Pathogen testing can be performed at any stage during the slaughtering process and results can be entered into the animal's medical and/or microbiological record, allowing for such information to be accessed by reference to each animal's A-TN. In a preferred embodiment, pathogen testing is performed on meat just after an animal is slaughtered by the taking of a sample of blood or other tissues. Other points of pathogen testing can be directed by USDA inspectors at the slaughter and/or processing facility, including, for example, just prior to the meat product's final packaging for retail distribution.

Figure 4:
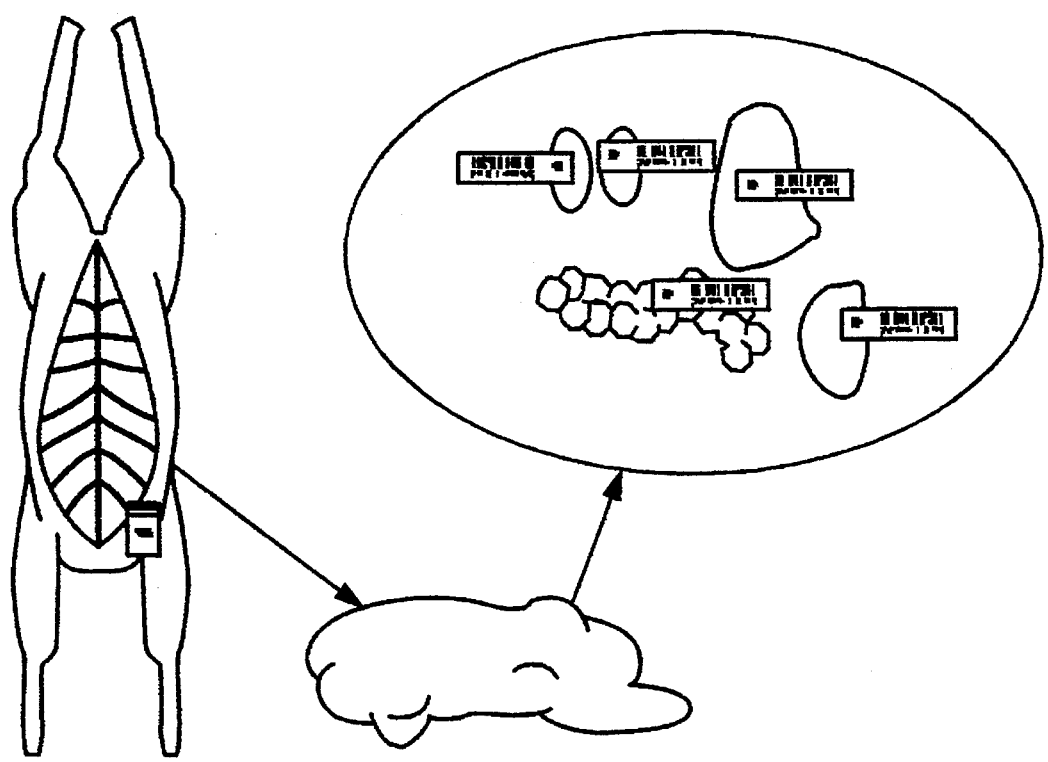
FIG. 4 is a schematic drawing showing the labeling of various offal items of an animal with a coded identity.

As shown in FIG. 4, in one embodiment of the invention, after the hide and viscera of an animal is removed, the animal's A-TN number is scanned to generate Offal Tracking Number (O-TN) tags which are attached to the animal's organs for trace back and identification purposes. The O-TN permits users of products derived from animal organs, such as insulin from porcine pancreas, blood from bovine fetuses, etc., to trace back such products to the producer and/or the animal of origin in the event a recall of the product becomes necessary.

As a carcass continues through the fabrication process, it is dressed and split into halves. The A-TN in the bag remains attached to one half of the carcass. Since conventional carcass rail systems do not allow for any split carcasses to be moved out of order, the two halves of the carcass are readily identifiable by their proximity. It is also possible, however, to produce an additional identifying tag to attach to each carcass half.

Prior to weighing, the dressed carcass is typically inspected by the USDA. If any visible defects or problems are identified, the carcass is set aside for further inspection. Because the A-TN is still attached to the animal, the USDA is able to trace the origin and ownership of the animal through the database record, and is therefore able to immediately contact responsible parties to alleviate problems as soon as they are noticed.

Figure 5:
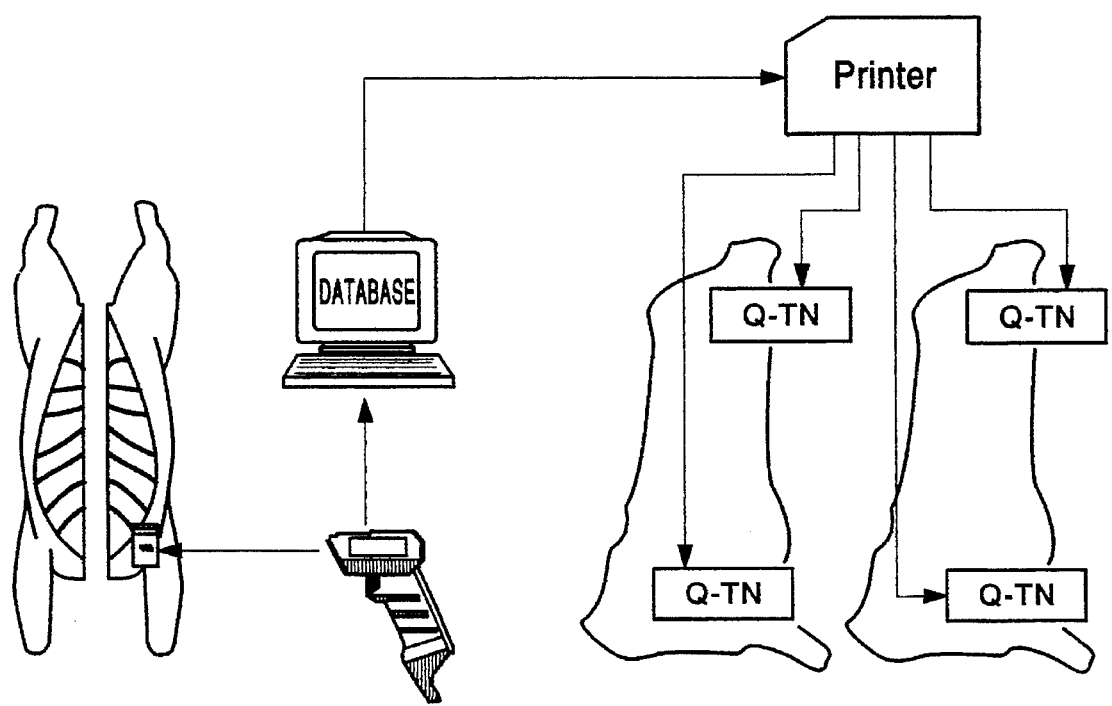
FIG. 5 shows the transfer of a Tracking Number (TN) from a carcass to designate pre-cut individual carcass quarters.

As shown in FIG. 5, the A-TN of individual carcasses can be scanned and the hot weight of the animal recorded into the computer. (The slaughter plant may also record any other information it chooses along with the A-TN, such as a lot number or a kill sequence number.) After scanning, the computer generates a predetermined number of Quarter Tracking Number (Q-TN) tags that duplicate the A-TN on the ear tag. For example, four Q-TN tags are generated to identify each quarter of a carcass. Each Q-TN tag is then affixed to specific portions of the carcass to maintain the animal identity.

Subsequent to being tagged, the carcasses are railed into a cooler to chill. After chilling, the carcasses are again weighed to determine the hot to cold shrink of the carcass. In one embodiment of the invention, the Q-TN tag is scanned prior to and after weighing and the shrink of each individual carcass is recorded and input into a computer.

After weighing and scanning, the carcasses are ribbed, (i.e. cut, in order to expose the rib) and graded. Each carcass is then graded by a USDA inspector and physically marked to designate its grade and yield classification. In one embodiment of the present invention, the Q-TN is scanned and a record of the grade for each carcass is entered into the database, providing valuable information relative to the feeding performance of the animal of origin.

The side of beef is then typically quartered and loaded onto a truck for transport to a fabrication plant. (Some meat processing facilities, however, have the ability to slaughter as well as fabricate animals.) A Bill of Lading may be produced from the database record based upon the Q-TN identification and/or quarter weights to further track the identity, quality, and weight of the meat products.

Figure 6:
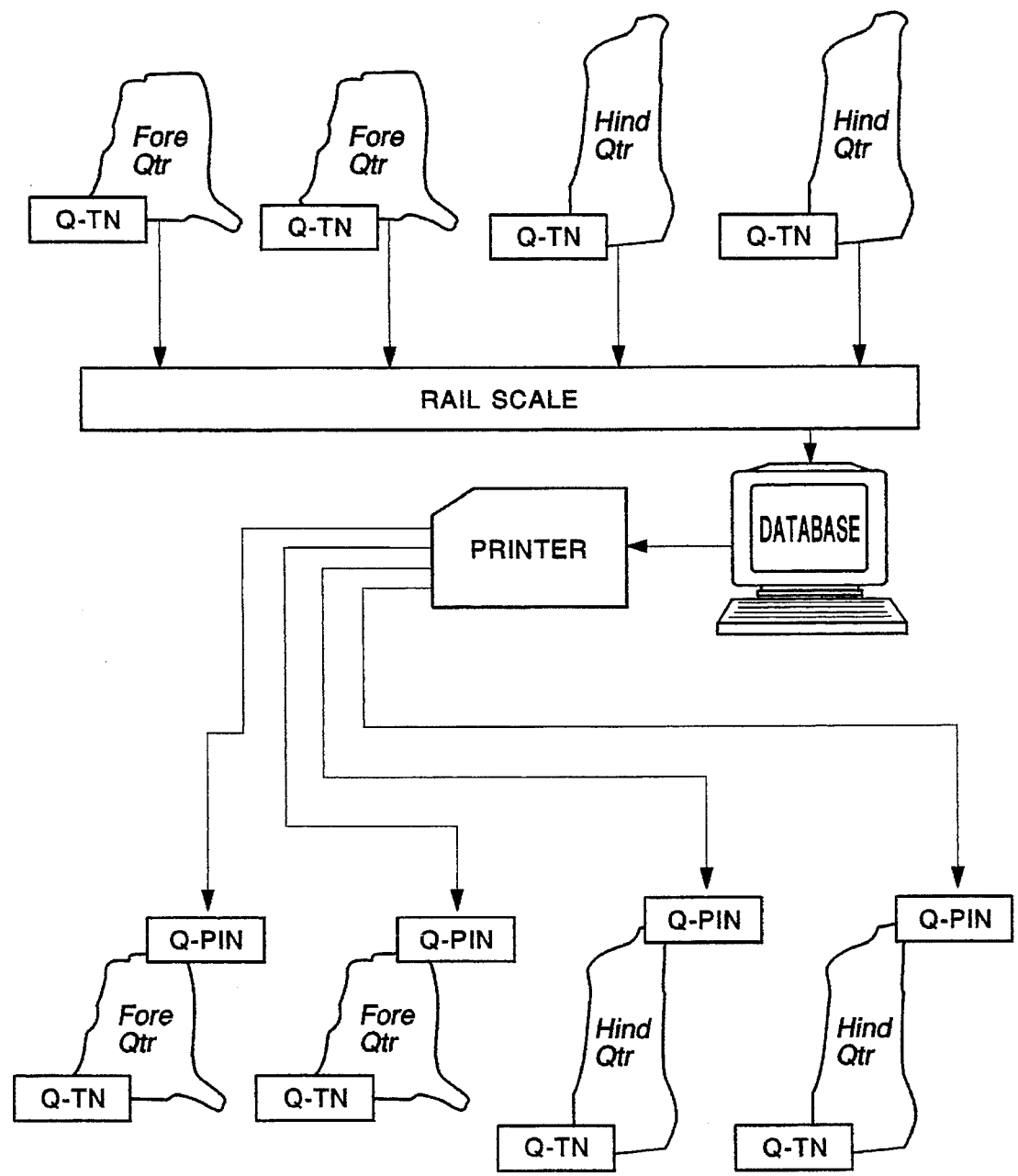
FIG. 6 shows how quarters are weighed and Quarter Production Identification Number (Q-PIN) tags are generated to identify each quarter by its corresponding weight and Quarter Tag Number.

As shown in FIG. 6, carcass quarters unloaded at the fabrication plant each have a Q-TN attached to them from the slaughter plant. Each quarter is weighed at the fabrication plant, the scale transmits information directly to a database, and a Quarter Product Identification Number (Q-PIN) tag, is generated for each quarter. Q-PIN tags have information thereon relating to the serial number, bar-code, and other product information (e.g. description, product code, weight, date and time of receipt, etc.). A Q-PIN tag is then attached to each quarter. In one embodiment of the process, each quarter has two tags; a Q-TN tag, describing the original animal from which the quarter came; and a Q-PIN tag, which describes the particular quarter. In another embodiment, a printer could be directed to print both the Q-TN and the Q-PIN on the same tag.

As shown in FIG. 6, by way of example, forequarters and hindquarters having Q-TNs affixed thereto are weighed. The scale sends this information to a printer which produces a Q-PIN tag indicating the weight of each quarter and also transmits this information to a computer which records the information in a database. A Q-PIN identifies a unique quarter (e.g., describes an organic choice hindquarter, weighing 150 lbs., received at 9:00 a.m. on Oct. 8, 1993). The Q-TN on the quarter identifies the animal from which the carcass is derived, and may also include other information (i.e., originating from a particular rancher, feedlot, etc.). All tags are preferably coded in a manner that facilitates the efficient and easy transfer of information into a database by scanning the Q-TN and the Q-PIN. Based upon the information provided by the Q-PIN, the computer determines the number of sections into which the particular quarter will be divided and directs a printer to produce a sufficient number of Production Tracking Number tags, or P-TN tags, for each cut of the quarter.

Figure 7:
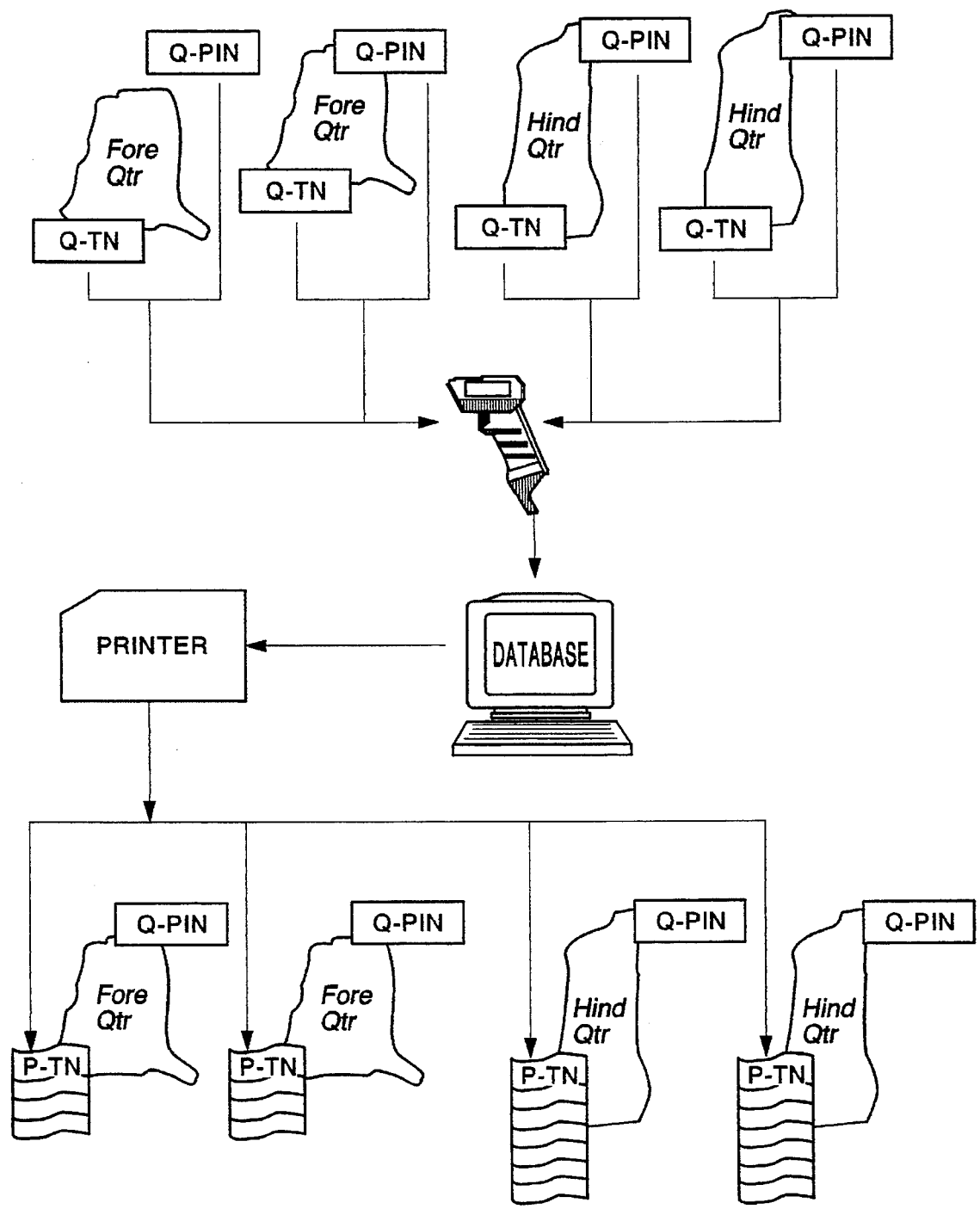
FIG. 7 shows the generation of Production Tracking Numbers (P-TNs) for quarters previously labeled with Quarter Production Identification Numbers (Q-PIN) and Quarter Tracking Numbers and the attachment of such P-TNs to the quarters of a carcass.

As shown in FIG. 7, by scanning the Q-TN and the Q-PIN tags, the information contained on each tag is combined in the database record. Once this is accomplished, the computer system can determine the number of pieces that a particular quarter will be processed into, and hence will determine the correct number of Production Tracking Number (P-TN) tags to be generated for the tagging of subsequent smaller portions of meat. Preferably, a bar-code printer is used to produce the appropriate number of P-TN tags for each quarter and such tags are affixed to each quarter.

In a preferred embodiment, a sequence number is also added to the end of each P-TN. To further aid in distinguishing each particular meat section derived from a particular quarter, the P-TN tags are then collectively affixed to the hindquarter in a manner that enables later meat processors to easily separate the tags for further tagging of meat sections severed from the quarter.

Figure 8:
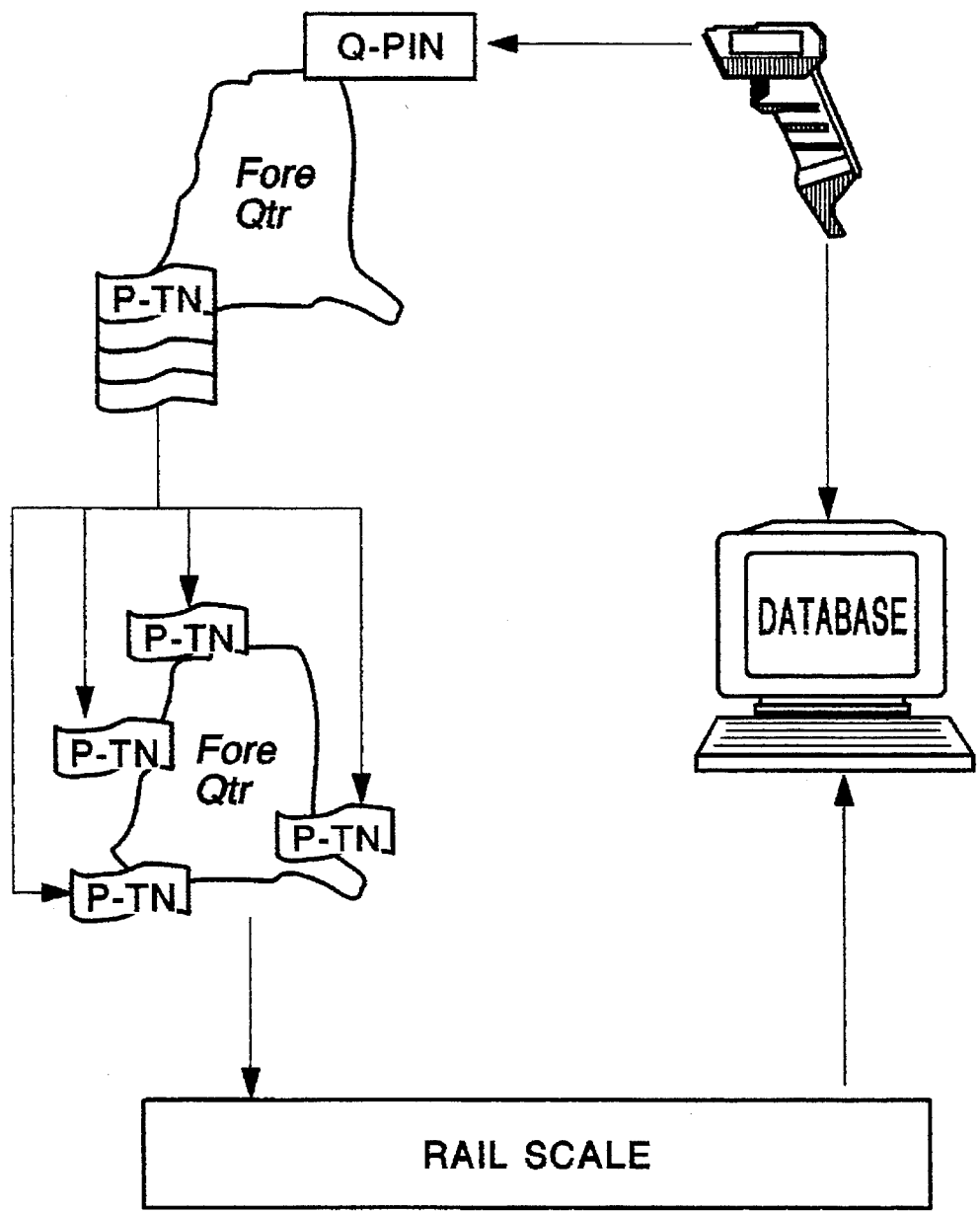
FIG. 8 shows the recording of the weights of quarters as identified by the scanning of each Q-PIN affixed to each quarter, as well as the affixing of Production Tracking Numbers (P-TN) to specific sites on each quarter prior to fabrication thereof.

As shown in FIG. 8, after a quarter is tagged with P-TN tags, it is held in a cooler until it is requested by production to be processed. Prior to entering production, the P-TN tags are removed from the quarter, separated, and attached to various predetermined locations on the quarter. The locations are determined based upon the cutting of the quarter into its various primal and sub-primal pieces. The P-TN tags are preferably attached in such a manner so as to allow the meat cutter to cut the quarter into primals and sub-primal cuts without having to move the tags. If a tag should have to be moved, the meat cutter is able to perform this function; however, the system is designed to keep this to a minimum.

When each quarter is removed from the cooler, it is again weighed and the Q-PIN is scanned to transmit the weight information to a computer as part of the inventory record. This information may contain, for example, the Q-PIN, scale device, weight, date, and time at which a quarter entered production. Because the Q-PIN references the weight of the quarter as it was received at the fabrication plant, the difference between the receiving weight and the weight of this carcass as it is readied for further fabrication, permits one to determine the amount of shrink that occurred while the quarter was in the cooler. Using this information the fabrication plant can adjust humidity levels, temperatures, production schedules, etc., to correct any carcass shrink problems.

Figure 9:
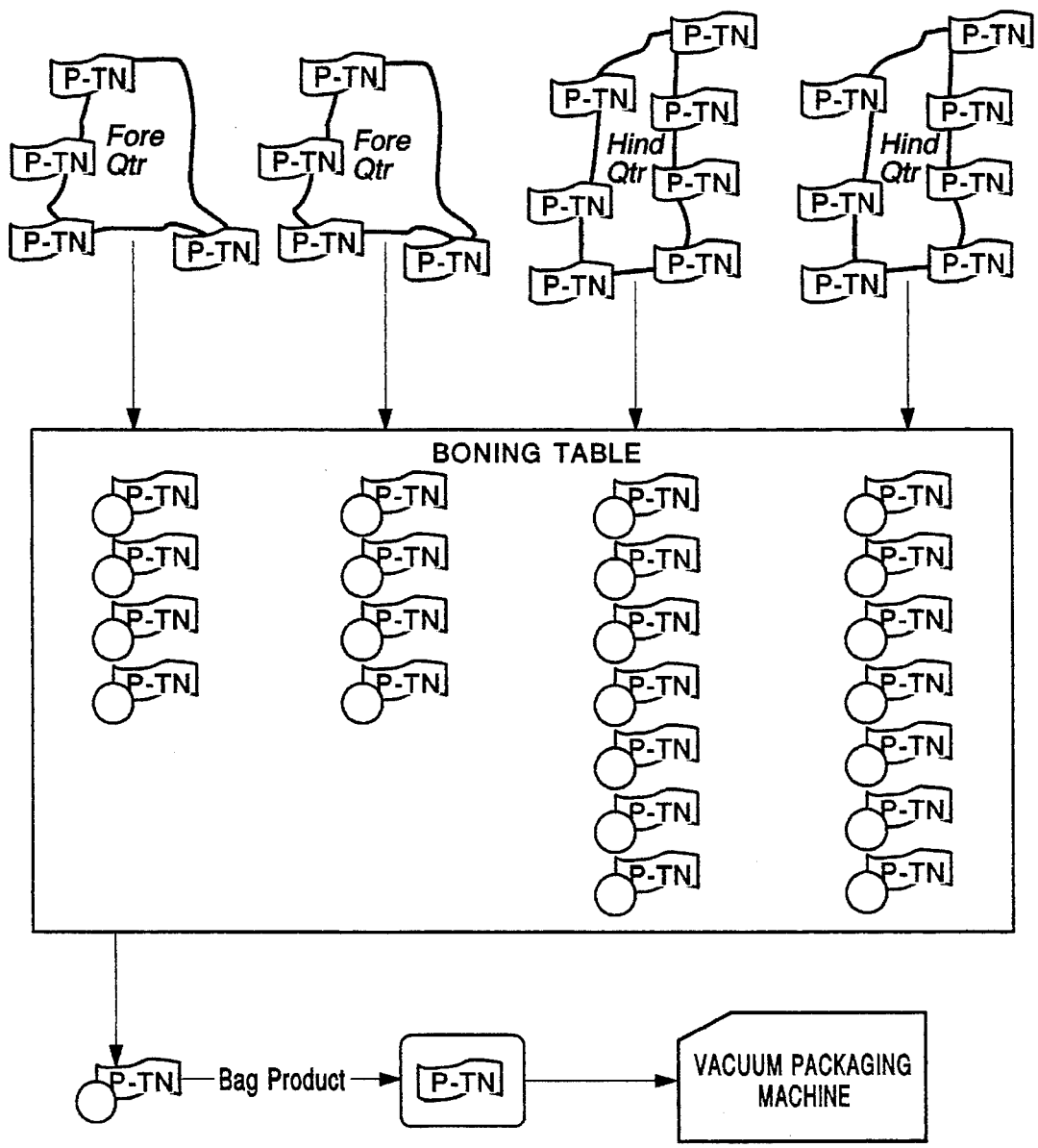
FIG. 9 shows the fabrication of a quarter into its respective primal and sub-primal cuts and the maintenance of Product Tracking Numbers (P-TN) during the fabrication and packaging process.

As shown in FIG. 9, the P-TN tagged quarters are then cut into their respective primal and sub-primal cuts. The P-TN tag is removed from the primal or sub-primal cut in order for the meat cut to be placed into a plastic bag. The P-TN tag is preferably designed so that the label can be peeled from its backing and attached to the outside of the bag containing the meat cut. The bagged meat item is then vacuum packaged.

Figure 10:
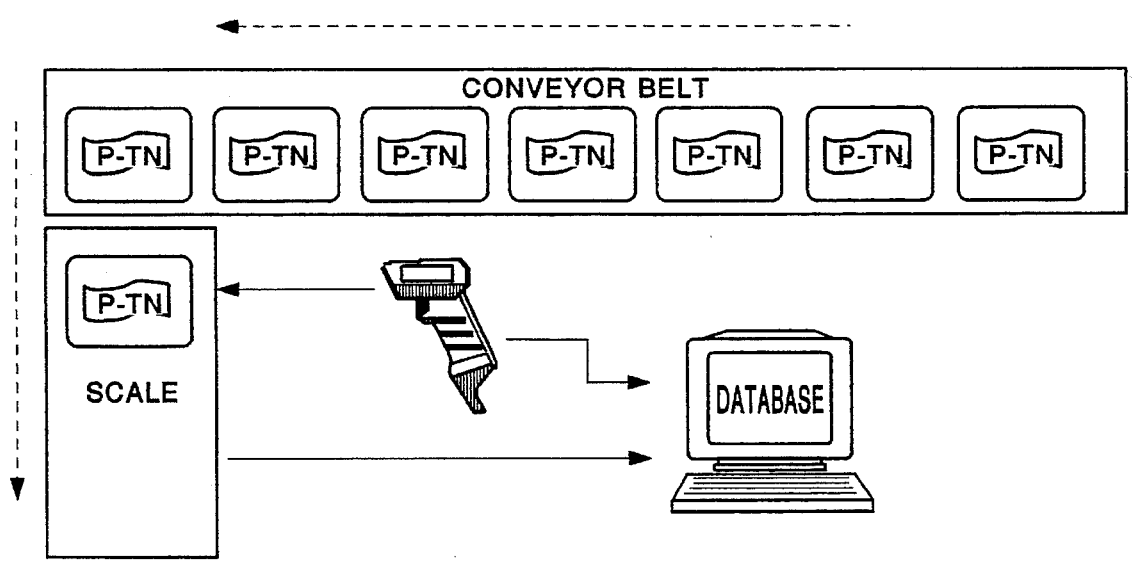
FIG. 10 illustrates the recording of weight for each vacuum packaged item, the correlation of such weight information to the item and the recording of such information into a database.

As shown in FIG. 10, after each cut of meat is vacuum packaged, it is weighed. The P-TN tag is computer scanned and the weight of each primal or sub-primal cut is recorded into the database. The total meat production of each animal is thus made available in the database record. The computer can distinguish the identity of individual cuts of meat based on the sequence number of a particular P-TN.

A further embodiment of the present invention involves the measurement of a food product, not necessarily involving weight (i.e., grade, fat, nutritional information, etc.), and such measurements can be performed prior to packaging of the product. The order by which certain measurements are taken is subject to the operator's needs.

Figure 11:
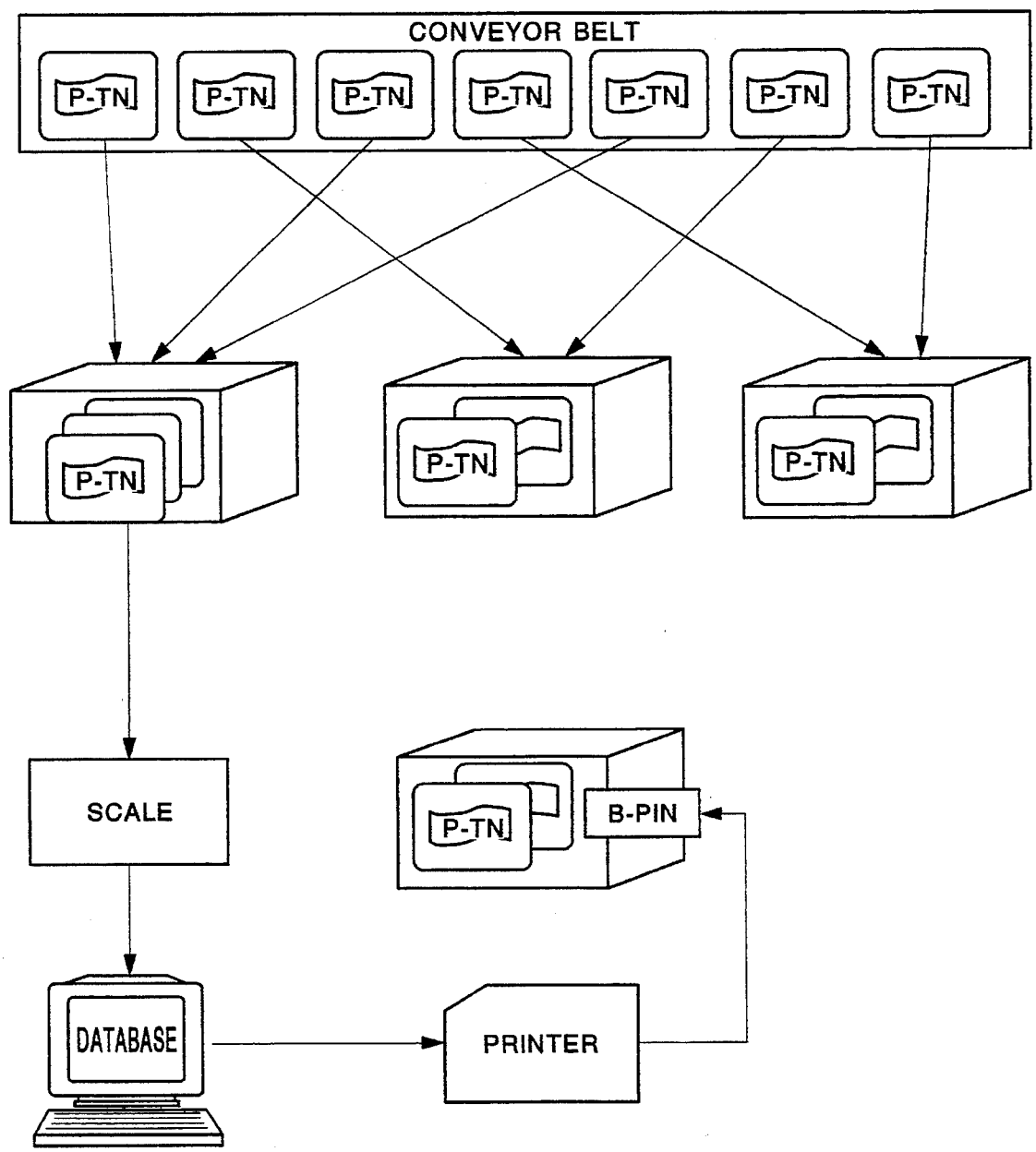
FIG. 11 shows the grouping of like product items into boxes and the generation of a Box Production Identification Number (B-PIN) indicating the identity and weight of the box.

As shown in FIG. 11, like cuts are grouped together in boxes, each meat item still identified by the P-TN label on the outside of the bag containing the meat item. Once a predetermined number of meat items are placed in each box, the box is weighed and this information is transmitted to a printer to generate a label having thereon a Boxed Production Information Number (B-PIN) describing the product in the box, scale identity, the weight of the box (less tare weight), the date, and the time of production, etc. The label is attached to the outside of the box and the information thereon is also recorded in the computer database.

Figure 12:
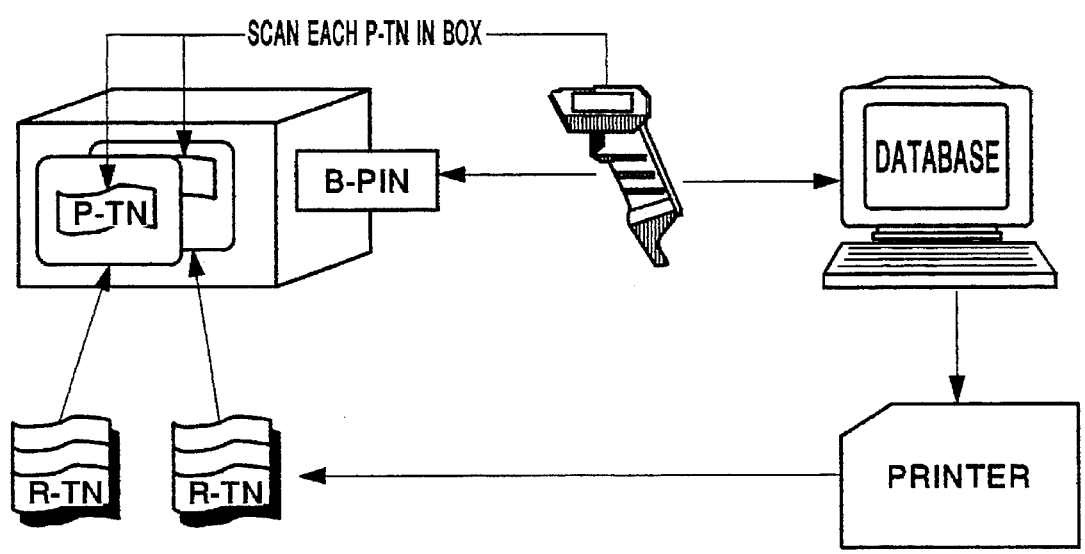
FIG. 12 shows the scanning and recording of each Box Production Information Number (B-PIN), the scanning of each individual (P-TN), and the subsequent generation of Retail Tracking Number (R-TN) labels that are attached to each primal in a box of primals.

As shown in FIG. 12, the B-PIN on the outside of the box and each P-TN tag on each meat item in the box can then be scanned so that the B-PIN and P-TN information are joined in the database record. In one embodiment of the invention, the computer directs a printer to create Retail Tracking Number (R-TN) tags corresponding to the P-TN of each meat item in the box. The R-TN labels are preferably attached sequentially as scanned to the bag containing each meat item. In another embodiment, the R-TN tags can be attached to the outside of the box via a R-TN pouch. The pouch would be opened by the retailer and matched to the appropriate P-TN of each primal. In yet another embodiment, the retailer could scan the P-TN of the primal cut and generate R-TN tags at the retail location.

At this point, the database record contains information regarding each box of meat in inventory via the B-PIN, and can also identify the animal which produced each cut in the box via the P-TN. Finally, the boxes can be sealed, placed on a pallet and stored in a warehouse for shipment to customers.

In one embodiment, the present invention provides a method by which animals can be purchased based upon their actual meat value instead of the conventional payment method. After the animals are fabricated, the database can essentially reassemble the fabricated meat portions back to its animal of origin. Once this data is obtained, the actual meat content of the animal can be established, and owners could then be paid for cattle based upon the entire lean content of the animal.

In another embodiment, a value can also be placed solely on the major primal cuts of an animal and a formula could then be established to pay for the entire animal's meat production based upon the amount and grade of such primal cuts. A still further embodiment entails the pricing of animals based upon the yield of a single primal cut, such as the loin, since the loin is the most valuable primal of the animal. By providing a method that more accurately correlates meat production with ultimate meat value, producers are rewarded for efficient meat production practices.

One particular aspect of the present invention relates to the tracking of processed meat products to determine the source of any health problems associated with tainted processed meat. Under standard industry processes for processed meat production, it is not possible to track down the individual animals that comprised a particular ground meat lot. The present invention seeks to alleviate this problem by identifying each meat item's P-TN in a processed meat lot. If a problem is later detected with the meat, either in the processed meat itself or with an animal in the lot, a recall can then be performed. The following description of tracking products for processed meat is also applicable to other processed items where the identity of individual starting materials is combined to produce a final product. For instance, produce (such as vegetables, fruit, etc.) or materials utilized to make vitamins and nutritional/mineral supplements can be tracked throughout a production process. Grapes, for example, can be harvested in lots, information concerning the growing conditions, pesticides and herbicides used, owner of the lot, soil and environmental conditions, additives, diseases, etc., can be recorded onto a computer database for later retrieval, and identifying codes can be used to keep track of the lot in subsequent processing operations. As the grapes are further processed, additional information can be added to the database and correlated with the identifying lot code, thereby providing a comprehensive tracking system for the products produced from such grapes (i.e., juice, wine, alcohol, etc.).

Figure 13:
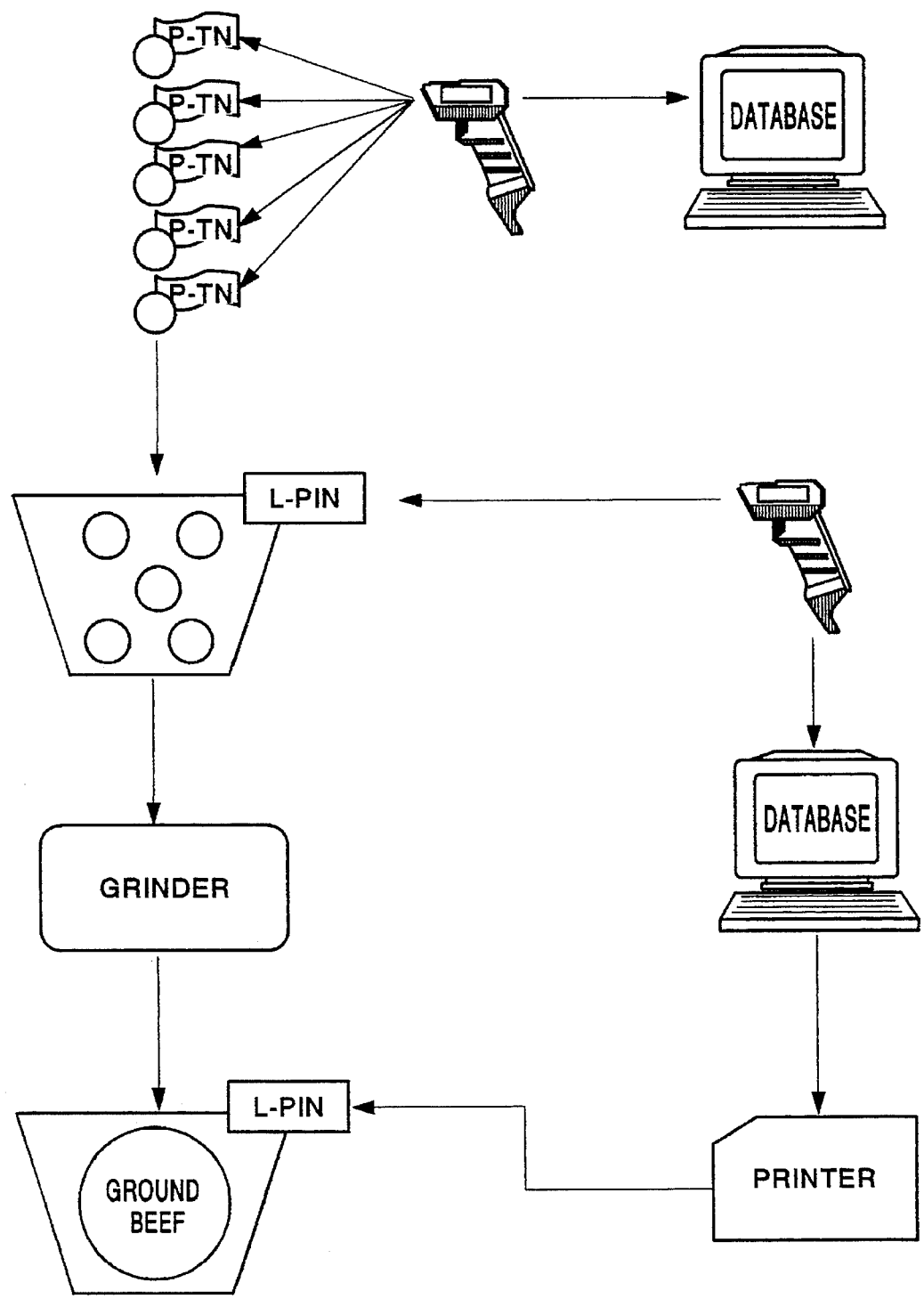
FIG. 13 demonstrates the tracking and label production process for a processed meat production lot.

As shown in FIG. 13, in accordance with the present invention a meat portion container to hold meat products to be ground is identified using a Lot Production Information Number (L-PIN), such number being entered into a computer database. Each primal or sub-primal's P-TN is scanned prior to being placed into the L-PIN labeled meat portion container. Once the meat portion container is full, it is sent to be further processed. The meat portions are fed into a grinder and the resulting product is collected in a second ground meat container. A L-PIN tag is generated that is identical to that of the first container and is attached to the ground meat container. The ground meat container is then emptied and its contents packaged into individual packages.

Figure 14:
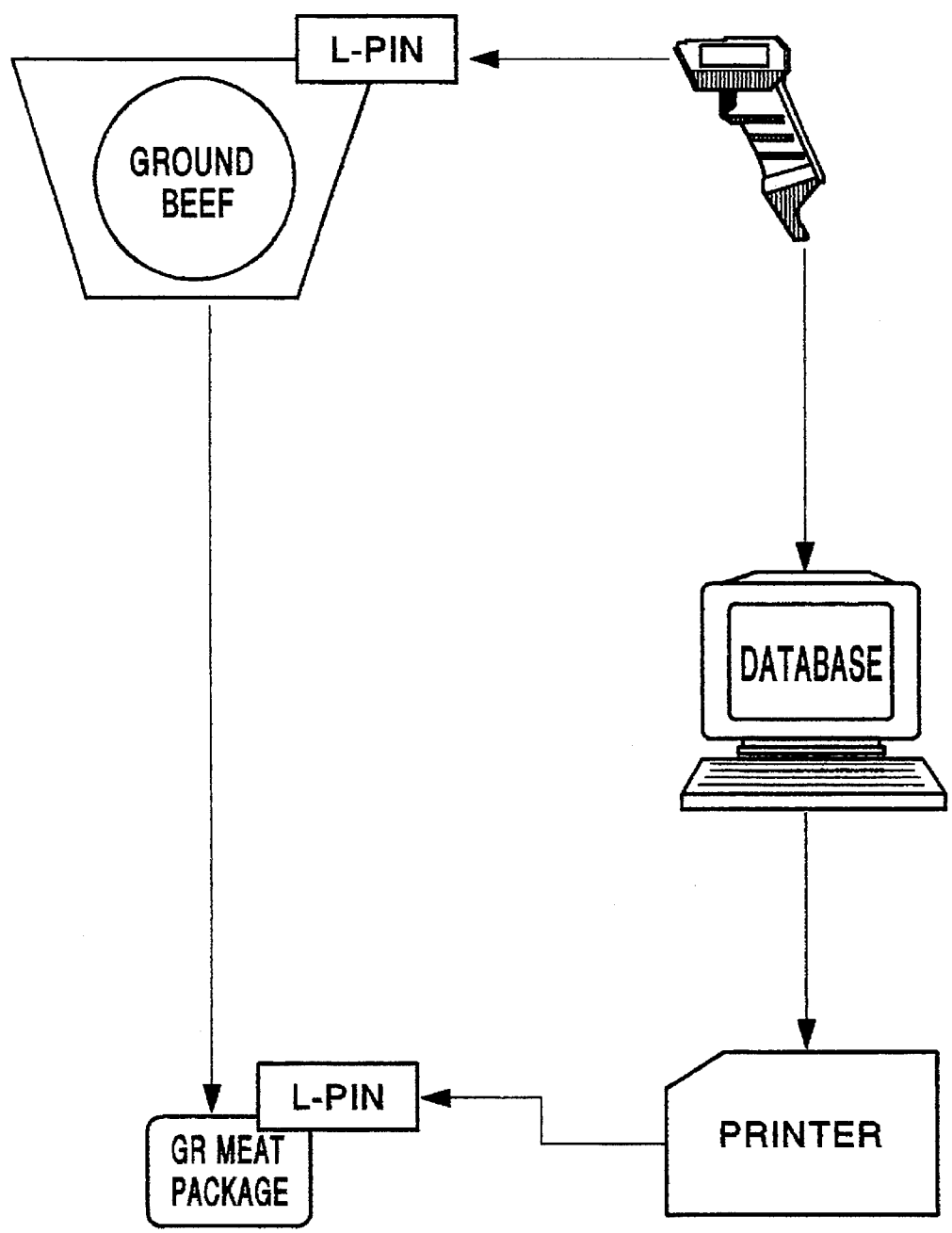
FIG. 14 shows the transfer of a Lot Production Information Number (L-PIN) to individual processed meat packages produced from said lot.

As shown in FIG. 14, the ground meat may be packaged in one of two forms, bulk or retail. If the ground meat is bulk packed, it is placed into a large bag to be reprocessed or repackaged. The bag is filled with ground meat, sealed, and weighed. The L-PIN from the ground meat container is scanned, L-PIN tags are generated having the identical L-PIN of the ground meat container and may also include the weight of the individual bulk packages. A L-PIN tag is then attached to each package.

Figure 15:
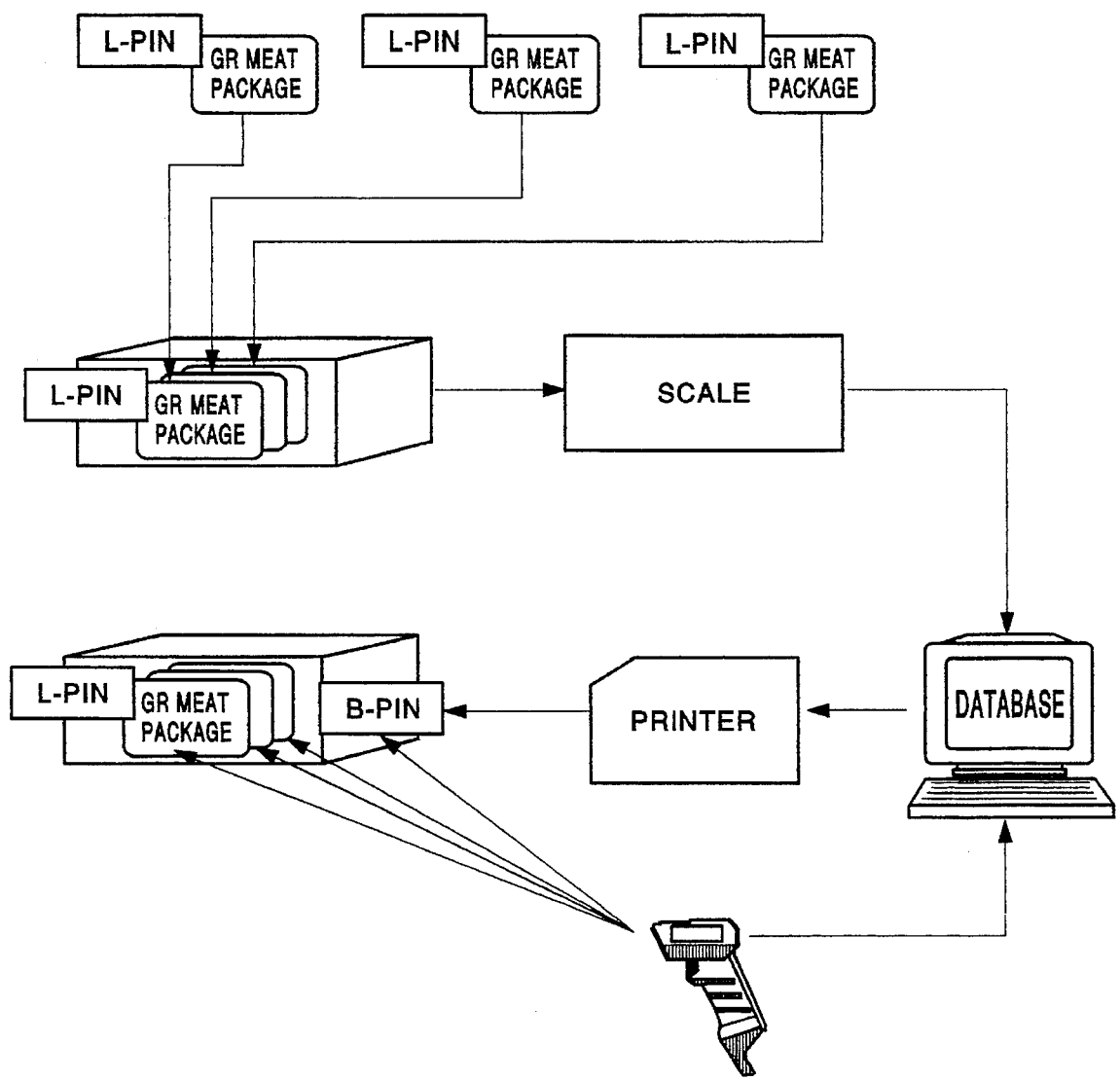
FIG. 15 illustrates the boxing of processed meat items, the generation of Boxed Production Information Number (B-PIN) tags to identify individual boxes of numerically identifiable packages of meat, and the recording of such information into a database.

As shown in FIG. 15, in the event multiple bulk packages are placed into a single box, the box is weighed and identified with a Boxed Product Identification Number (B-PIN). The B-PIN is then scanned into a computer database and is combined with the L-PIN information of individual packages in the box so that a series of L-PIN retail tags can be produced. The L-PIN retail tags are then attached to the bulk packages for retail identification of retail packages. A retail package refers to a package that does not require further processing or repackaging by a retailer. As shown in FIG. 15, the B-PIN is scanned, as are the L-PIN tags on the ground meat packages in the B-PIN labeled box, to provide a computer record of what particular packages are contained in a particular box.

Figure 16:
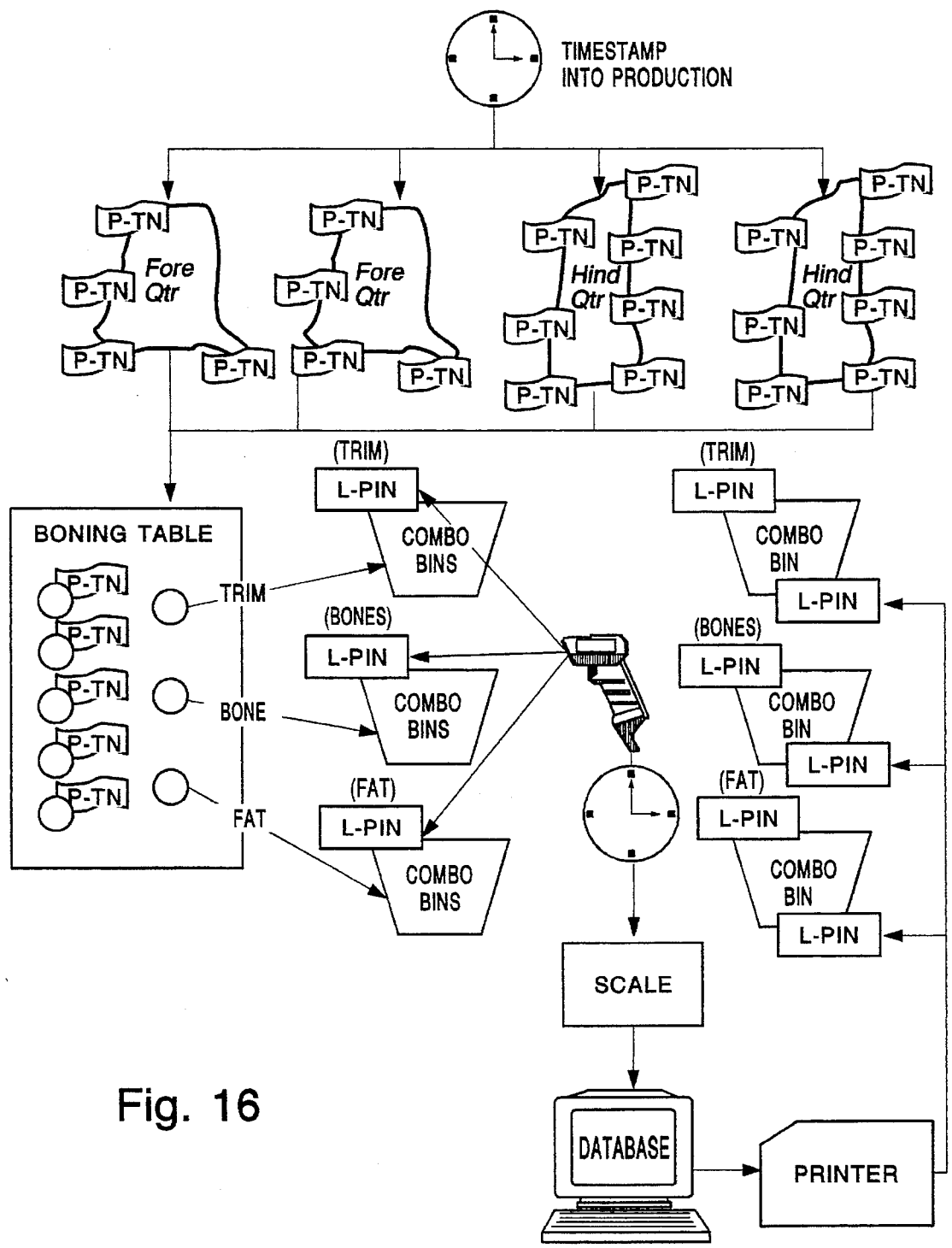
FIG. 16 shows the tracking of meat items in combo bins through a date and time stamp method.

As shown in FIG. 16, yet another aspect of the present invention involves the ability to track non-primal meat products generated in a meat processing operation. The normal processing of meat results in the accumulation of large amounts of fat, bones, and trim. Given the relative value of such products, tracking by lot is believed sufficient for most operations. If individual tracking of such products is desired, however, the method described above can be easily adapted to facilitate such an objective. To keep track of specific lots of products using the present invention, individual containers, called combo bins, are identified with a L-PIN and are filled with bones, others with fat, and still others with varying trim cuts. Each L-PIN is date and time stamped for future reference and each L-PIN is entered into a computer database. When carcass quarters are produced, their Q-PINs are scanned and when weighed, the Q-PIN information, as well as the date and time of its entry are entered into the database as part of the inventory record. As the fat, bones, and trim are removed from the primal and sub-primal cuts, the combo bins are filled with these elements.

The date and time when a L-PIN numbered combo bin is completely filled is recorded in the database. This date and time information allows an operator to reference the Q-TNs in the combo bin, such Q-TNs referenced by using the Q-PIN of the meat carcass quarters going "into production" at a designated time prior to the combo-bin's completion.

The time elapsing during any particular production process can be determined and correlated with the tagged portions entering the production process at a particular time. With this information, the database is able to identify the Q-TNs contained in a combo bin container, thus allowing for the identification of individual animals from which a given lot of fat, bones, trim, and/or other meat products was derived.

Figure 17:
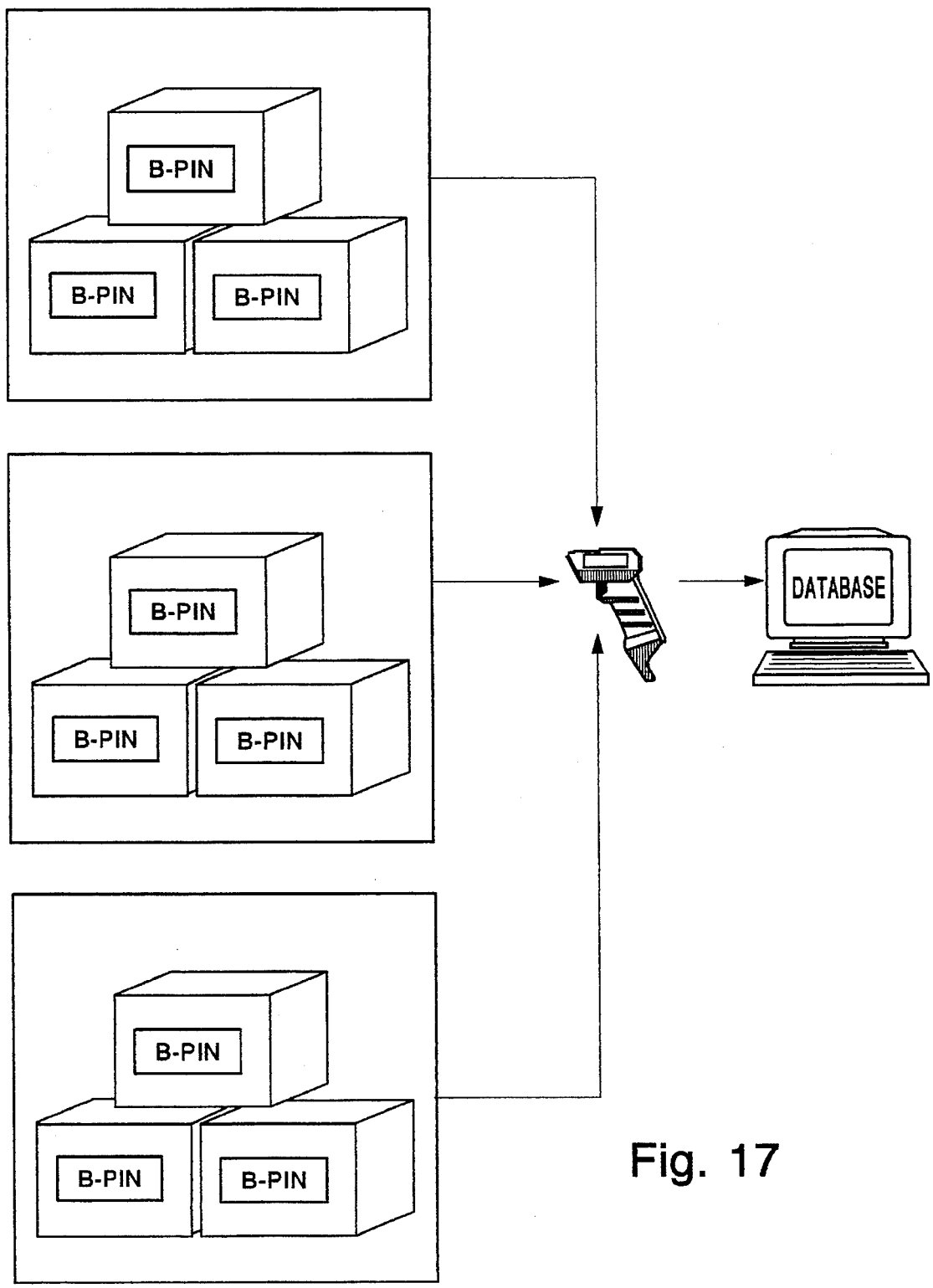
FIG. 17 shows the recordation of Box Production Information Number (B-PIN) tags as correlated to particular customer orders and the entry of such information into a database.

As shown in FIG. 17, the final stage of fabrication is the shipping process. To ship an order, a shipping clerk examines a shipping document and determines which items the customer has ordered. These items are staged and palletized from the meat inventory. Once the products are staged, the clerk scans the customer order number on the shipping document. Each item staged for shipment is then scanned to enter such information into the computer database, and from such information, shipping documents and invoices can be generated. The database thus can determine the boxes sent to each customer, and can further distinguish the meat items in each box and reference those items back to the animal of origin.

Figure 18:
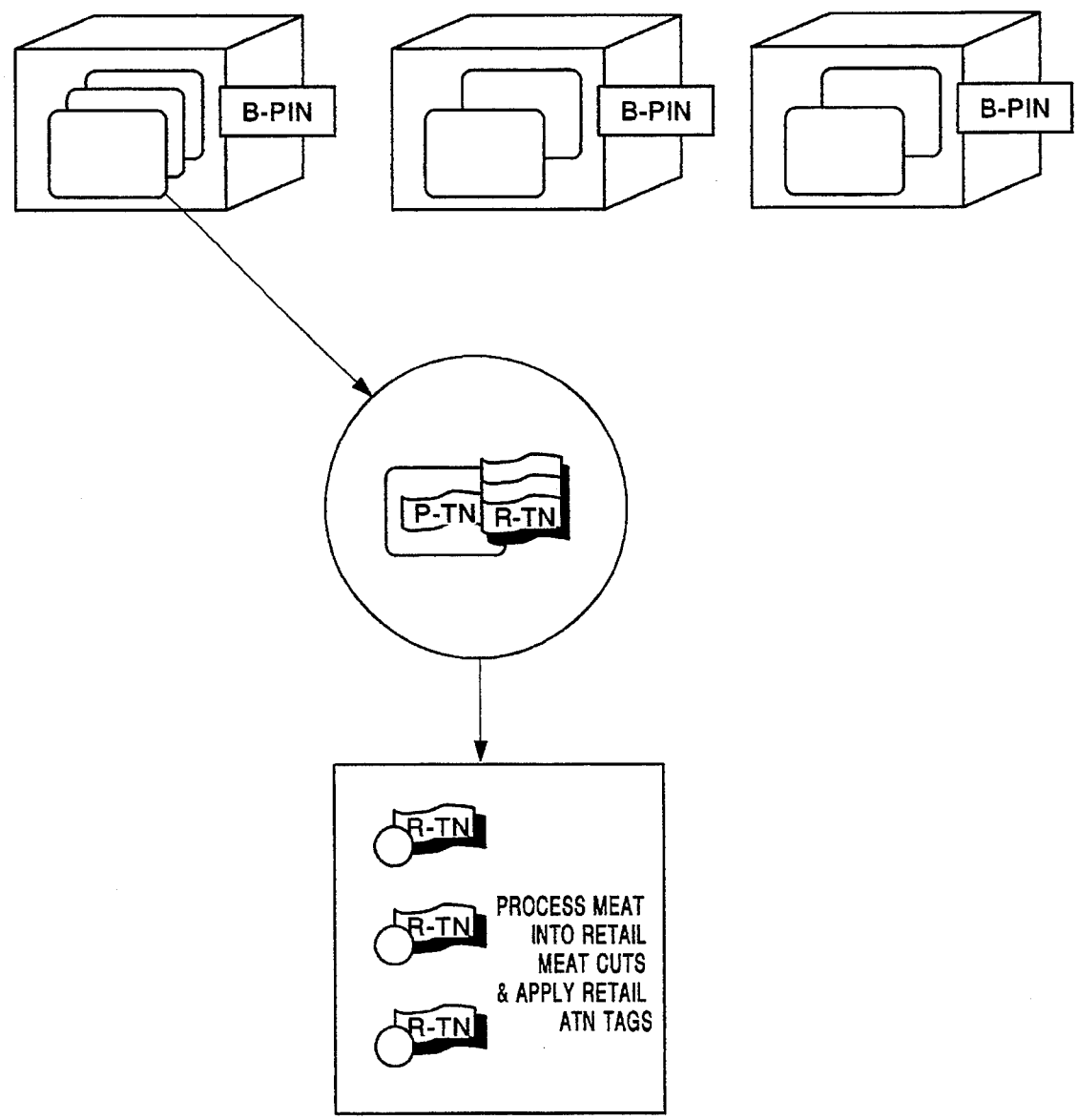
FIG. 18 shows the generation and application of Retail Tracking Numbers (R-TN) to retail meat cuts.

As shown in FIG. 18, a further aspect to the present invention relates to the retail level of distribution. A retailer typically purchases one of two types of items: either a product that is "retail ready" or a product that requires further processing. If the product is retail ready, then the R-TN (or L-PIN in the case of processed meats) is already identifiable on the retail package and no further actions are required on the part of the retailer to ensure animal origin identification. If, however, the retailer has purchased an item that requires further processing into retail cuts or into smaller ground meat packaging, then the retailer must be able to maintain the original animal identity of each product. To accomplish this, packaged and P-TN labeled meat pieces are opened, the meat is removed and each meat item is processed into a retail cut and/or ground product and packaged. A number of R-TN tags are generated reflecting the P-TN present on the larger meat cut or ground meat package opened in order to create smaller packages. These final labels are attached to each retail item, allowing for trace back and verification of the meat items purchased by a consumer. In one embodiment, a bar-coded number appears on the package, along with a human readable identification number. If a consumer should have a question as to whether the product is really organically produced, for example, the present invention provides a method of verifying the "organic" production process.

In accordance with the present invention, a consumer could contact a retailer with a R-TN identification, the retailer could contact the fabricator who sold the meat and have the fabricator search his computer database for the P-TN in question. The P-TN will permit identification of all the information relative to the purchase, fabrication, slaughter, and feeding of the animal. The consumer can thus be contacted and given a detailed report of the meat product's origin and processing. For instance, the medical history of the animal could be generated to describe all medications, treatments and tests that were done to the animal. Information concerning the location and transport of an animal during the production process could be recalled. The database record could also be accessed to verify the feeds fed to the animal, the genealogy of the animal, etc. The present invention importantly provides a method of determining the production history of a product to identify the source of pathogens and to thereby facilitate the recall of products originating from particular distributors, fabrication plants, processing plants, feedlots, raisers, or individual animals.

As consumer tastes and demands change, the number of products making particular product claims has risen. Consumers are demanding information concerning the nutritional value, fat content, natural status, and organic status of food products. The USDA has had a difficult time certifying producer's claims concerning such products because it does not possess the ability to monitor the processes used in their production. The present invention creates a record that allows for substantiation of product claims and provides governmental authorities with an audit trail to enable the verification of the various product claims made by food product producers.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method for tracking the production history of a food product, comprising:

affixing a first label to a food product, said first label having an identifying code thereon;

fabricating said food product into various portions; and generating said identifying code on as many additional labels as required for identifying said various portions of the food product, wherein said generating step is performed during the time said portions are produced.

2. The method as set forth in claim 1, wherein said food product comprises an animal byproduct.

3. The method as set forth in claim 2, wherein said animal byproduct is derived from one or more of poultry, bovine, porcine, equine, sheep, fish, shellfish and wild game.

4. The method as set forth in claim 2, wherein said step of affixing a label is performed within three months of the animal's birth from which said animal byproduct is derived.

5. The method as set forth in claim 2, wherein said step of affixing a label is performed after said animal has assimilated all chemical, additive, hormone and radioactive agents.

6. The method as set forth in claim 1, wherein said means for accessing said information comprises a computer.

7. The method as set forth in claim 1, wherein said identifying code on said additional labels has information capable of being read by an electronic device.

8. The method as set forth in claim 7, wherein said additional labels are selected from the group consisting of a bar coded tag, magnetically encoded tag, and an implanted identification device.

9. The method as set forth in claim 1, wherein said method is used to verify that a particular production process was followed.

10. The method as set forth in claim 9, wherein said production process is selected from the group consisting of conventional, organic and natural processes.

11. The method as set forth in claim 1, wherein said identifying code on said label is maintained in a database throughout the production process.

12. The method as set forth in claim 1, wherein said additional labels comprise plastic, glass, fiberglass, composite material or metal.

13. The method as set forth in claim 1, wherein said additional labels are capable of being sanitized.

14. The method as set forth in claim 1, wherein at least one of said additional labels includes information in human readable form.

15. The method as set forth in claim 1, wherein said step of generating includes providing said additional labels with an adhesive backing permitting the attachment of each of said additional labels to a retail product package.

16. The method as set forth in claim 1, wherein said food product is selected from the group consisting of animal byproducts, vegetables, fruits, grains, vitamins and mineral supplements.

17. The method as set forth in claim 1, wherein only a single label is initially affixed to said food product.

18. The method as set forth in claim 1, wherein said food product is an animal and said first label is an ear tag or a leg band.

19. The method as set forth in claim 1, wherein said step of affixing said label is performed prior to said food products' assimilation of all chemical, additive, residue, hormone and radioactive agents.

20. The method as set forth in claim 1, further including steps of:
   recording information at more than one instance during the production of the food product; and
   correlating said information with said identifying code.

21. The method as set forth in claim 20, further including a step of providing a means for accessing said information by referencing any one of said additional labels.

22. The method as set forth in claim 20, wherein said information is selected from the group consisting of weight of the product after specific processing steps, microbacterial profile of said product, date and time of processing of said product, original and subsequent producers of said product, the organic and/or natural status of said product, genetic information, lean-to-fat ratio, medical history, and agent exposure information including chemical, additive, residue, hormone and radioactive agents.

23. The method as set forth in claim 20, wherein said step of recording information is performed more than once during said method.

24. The method as set forth in claim 20, wherein said information is recorded onto a computer database.

25. The method as set forth in claim 1, wherein said generating step is performed at least twice.

26. The method as set forth in claim 1, wherein said step of generating includes printing said identifying code on said additional labels.

27. A method for determining an animal of origin from which an animal byproduct is derived, comprising:
   providing an animal with a first coded identification tag having identification information thereon;
   slaughtering said animal;
   fabricating said animal into various portions; and
   generating said identification information on as many additional tags as required for identifying said various portions, said generating step performed at a time when said various portions of said animal are produced.

28. The method as set forth in claim 27, further comprising adding additional information to said additional tag, said additional information selected from the group consisting of the weight of the product after specific processing steps, microbacterial profile of said product, date and time of processing of said product, original and subsequent producers of said product, the conventional, organic and/or natural status of said product, genetic information, lean-to-fat ratio, nutritional information, medical history, and agent exposure information including chemical, additive, residue, hormone, and radioactive agents.

29. The method as set forth in claim 27, wherein said identification information on said first coded tag is communicated to a consumer.

30. The method as set forth in claim 27, further comprising:
   removing the hide from said animal and maintaining said first coded tag with said dehided portion of said animal.

31. A method for tracking pathogens and residues on an animal byproduct, comprising:
   associating a first code with an animal prior to fabricating said animal, said code having information identifying said animal;
   fabricating said animal into at least two portions;
   associating each of said portions with said code;
   testing for pathogens and residues on at least a first portion of said portions;
   storing a result obtained from said testing step;
   generating said code on each of a plurality of tags as required during said step of fabricating so that a tag from said plurality of tags is affixed to each of said portions;
   maintaining said first code with each of said portions; and
   tracking the origin of the pathogens and residues on said portions by referring to said first code.

32. A method as set forth in claim 31, wherein said step of testing includes:
   testing said first portion for the presence of pathogens prior to packaging said portion; and
   determining said animal from which said first portion was derived by referencing said information identifying said animal.

33. The method as set forth in claim 31, wherein said result includes information comprising:
   weight of the product after specific processing steps, microbacterial profile of said product, date and time of processing of said product, original and subsequent producers of said product, the organic and/or natural status of said product, genetic information, lean-to-fat ratio, medical history, and agent exposure information including chemical, additive, residue, hormone and radioactive agents.

34. The method as set forth in claim 31, wherein said step of testing comprises analyzing tissue, blood or excrement.

* * * * *